US006829059B1

(12) United States Patent
Kimura

(10) Patent No.: US 6,829,059 B1
(45) Date of Patent: Dec. 7, 2004

(54) PRINT SYSTEM, INFORMATION PROCESSING APPARATUS, PRINT JOB REGISTERING METHOD, AND STORAGE MEDIUM

(75) Inventor: Mitsuo Kimura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 107 days.

(21) Appl. No.: 09/354,727

(22) Filed: Jul. 16, 1999

(30) Foreign Application Priority Data

Jul. 21, 1998 (JP) .......................................... 10-219918
Jun. 24, 1999 (JP) .......................................... 11-178479

(51) Int. Cl.[7] .............................................. G06K 15/00
(52) U.S. Cl. ...................................... 358/1.15; 358/1.1
(58) Field of Search ........................ 358/1.1, 1.9, 1.11, 358/1.13, 1.14, 1.15, 1.16, 539, 404, 444, 401, 402, 403, 470; 710/8, 10, 14, 15, 16, 62.72

(56) References Cited

U.S. PATENT DOCUMENTS 5,699,495 A     12/1997  Snipp .......................... 395/114
5,802,260 A  *  9/1998  Shimakawa et al. ........ 358/1.15
6,115,132 A     9/2000  Nakatsuma et al. ........ 358/1.14
6,152,629 A  * 11/2000  Yoneyama et al. ........... 400/582

FOREIGN PATENT DOCUMENTS

EP              0 691 619           1/1996

* cited by examiner

*Primary Examiner*—Arthur G. Evans
(74) *Attorney, Agent, or Firm*—Fitzpatrick, Cella, Harper & Scinto

(57) ABSTRACT

A client PC has a virtual print server service (client) for searching a server on a network and issuing a print request to the searched server. The server has a virtual print server service (server) for searching a printer on the network on the basis of the print request from the client and registering a print job into the searched printer. Thus, when the client PC temporarily participates in the network and allows the printer connected to the network to print, the troublesome setting in the client PC is unnecessary.

46 Claims, 22 Drawing Sheets

FIG. 14

PROPERTY OF VIRTUAL PRINT SERVER SERVICE (SERVER)

| VIRTUAL PRINTER | NETWORK PRINTER | DETAIL |

VIRTUAL PRINTER CHECKED : DEFAULT

| VIRTUAL PRINTER | NETWORK PRINTER | PRINTER DRIVER |
|---|---|---|
| ☑ LBP-930 | 150.61.1.101@lpt1 | LASER SHOT LBP-930 |
| ☑ LBP-830(1) | 150.61.1.102@lpt1 | LASER SHOT LBP-830 |
| ☐ LBP-830(2) | 150.61.1.103@lpt1 | LASER SHOT LBP-830 |
| ☑ LBP-730(1) | 150.61.1.104@lpt1 | LASER SHOT LBP-730 |
| ☐ LBP-730(2) | 150.61.1.105@lpt1 | LASER SHOT LBP-730 |
| ☐ LBP-730(3) | 150.61.1.106@lpt1 | LASER SHOT LBP-730 |

[ ADD ]  [ DELETE ]  [ FORM ]

[ OK ]  [ CANCEL ]

FIG. 23

PROPERTY OF LPRINTER

| GENERAL | PORT | SCHEDULE |

LPRINTER

PORT TO PRINT

| PORT | DESCRIPTION | PRINTER |
|---|---|---|
| ☐ LPT1: | LOCAL PORT | |
| ☐ LPT2: | LOCAL PORT | |
| ☐ COM1: | LOCAL PORT | |
| ☐ FILE: | LOCAL PORT | |
| ☐ UNKNOWN@LPRINTER-730 | VIRTUAL PRINTER | LPRINTER-730 |
| ☑ UNKNOWN@DEFAULT | VIRTUAL PRINTER | LPRINTER |

[ADD] [DELETE] [FORM]

[OK] [CANCEL]

PRINT SYSTEM, INFORMATION PROCESSING APPARATUS, PRINT JOB REGISTERING METHOD, AND STORAGE MEDIUM

BACKGROUND OF THE INVENTION

1. Field of the Invention

The invention relates to a print system, a print job registering method, and a storage medium. More particularly, in a system such that a printer connected to a network is used by a plurality of clients connected to the network, the invention relates to a print system, a print job registering method, and a storage medium suitable to a case of enabling the printer to be easily used even from a client such as a portable PC (personal computer) which is only temporarily connected to the network.

2. Related Background Art

In recent years, the spread of personal computers in an office is remarkable and a network technique to connect them is also developing. As a using method of a printer as well, although one printer is connected to one personal computer and is used hitherto, in recent years, a case where the printer is connected to a network and is used in common by personal computers connected to the network is increasing.

SUMMARY OF THE INVENTION

The foregoing conventional technique, however, has the following problems. That is, under an environment such that the printer connected to the network is used in common by a plurality of personal computers as mentioned above, when the user wants to use the printer from a portable PC such as a notebook-sized personal computer, after the portable PC was connected to the network, the setting for allowing the portable PC to recognize the printer on the network is necessary. The portable PC, therefore, has to change the setting in accordance with a network on the movement destination side each time the portable PC is moved.

The invention is made in consideration of the foregoing problems and it is an object of the invention to provide a print system, a print job registering method, and a storage medium in which even when a portable PC temporarily participates in a network and allows a printer connected to the network to print, troublesome setting in an external apparatus is unnecessary.

To accomplish the above object, according to the invention, there is provided a print system in which a printing apparatus and an upper apparatus to manage the printing apparatus are connected onto a network and an external apparatus can be newly connected to the network, wherein the external apparatus has print requesting means for requesting the upper apparatus to print, and the upper apparatus comprises printing apparatus detecting means for detecting the printing apparatus on the network on the basis of the print request; and registering means for registering a print job to the detected printing apparatus.

Further, according to the invention, the external apparatus has printing apparatus input means for inputting a designation of the printing apparatus.

Further, according to the invention, when the print requesting means of the external apparatus issues the print request without designating the printing apparatus, the printing apparatus detecting means of the upper apparatus detects the printing apparatus on the basis of the print request.

Further, according to the invention, when the print requesting means of the external apparatus designates a default printing apparatus and issues the print request, the printing apparatus detecting means of the upper apparatus detects the default printing apparatus on the basis of the print request.

Further, according to the invention, when the print requesting means of the external apparatus designates a printer driver and issues the print request, the printing apparatus detecting means of the upper apparatus detects the printing apparatus corresponding to the printer driver on the basis of the print request.

According to the invention, the external apparatus has upper apparatus detecting means for detecting the upper apparatus on the network.

According to the invention, the external apparatus has upper apparatus input means for inputting a designation of the upper apparatus, and the upper apparatus detecting means of the external apparatus detects the upper apparatus on the network unless the upper apparatus is designated by the upper apparatus input means.

Further, according to the invention, the external apparatus is a portable personal computer.

These and other objects and features of the present invention will become more fully apparent from the following description and appended claims taken in conjunction with the accompanying drawings.

BRIEF DESCRIPTION OF THE DRAWINGS

FIG. 14 is an explanatory diagram showing a set picture plane to set a default printer on the server side of a virtual print server;

FIG. 23 is an explanatory diagram showing a set picture plane to set a printer on the client side of the virtual print server;

DETAILED DESCRIPTION OF THE PREFERRED EMBODIMENT

An embodiment of the invention will now be described hereinbelow with reference to the drawings.

Figure 2:
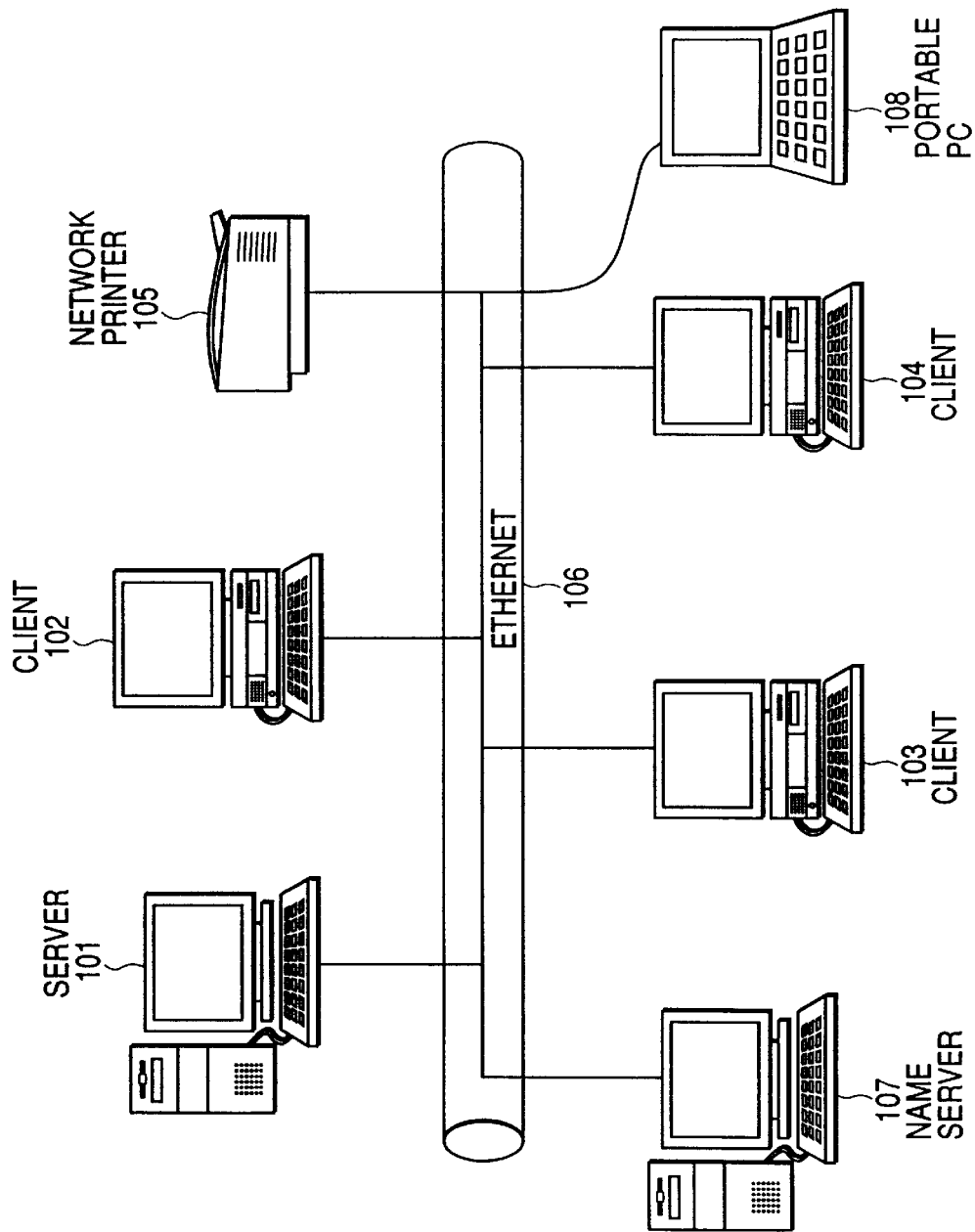
FIG. 2 is a block diagram showing a construction of a network system to which a virtual server is applied.

First, a virtual print server system serving as a prerequisite of the invention will be described. FIG. 2 is a block diagram showing a construction of a network system to which a virtual server in the embodiment of the invention is applied.

A network system according to the embodiment of the invention has a construction such that a server 101, client computers (client PCs) 102, 103, and 104, a network printer 105, a name server 107, and a portable PC 108 are connected onto a network 106. It is now assumed that a plurality of network printers (not shown) other than the network printer 105 are connected to the network 106. In FIG. 2, it is assumed that n client computers (client PCs) are connected (in the embodiment, only three client PCs are shown for convenience of explanation).

The portable PC is not always connected to the network 106. Therefore, an interface for allowing the portable PC 108 to be properly connected is prepared for the network 106.

The name server 107 has a database in which a name of a machine and information regarding the machine have been registered. For example, information regarding the server 101 such as machine name, server name, network address, and the like of the server 101 is registered in the database of the name server 107. The client can extract the information regarding the server from the database.

For example, when the portable PC 108 is connected to the network 106, an inquiry of the server is performed to the name server 107 in order to detect the server on the network. The OS (Operating System) of the portable PC 108 has a function for automatically detecting the name server 107.

A construction of each of the above sections will now be described in detail. The client PCs 102, 103, and 104 are connected to the network 106 by a network cable, can execute various programs such as an application program and the like, and each of them has a printer driver having a function to convert print data into a printer language corresponding to the printer. It is now assumed that the printer driver supports a plurality of printer languages.

Similarly, the portable PC 108 can also execute various programs such as an application program and the like and has a printer driver having a function for converting print data into a printer language corresponding to the printer. It is now assumed hereinbelow that a portable PC is also included in a simple client PC.

The server 101 is connected to the network 106 by the network cable, accumulates files which are used in the network 106, and monitors a using state of the network 106. Further, the server 101 also manages a plurality of network printers (not shown) connected to the network. The server 101 of the embodiment further has functions such that when print requests (print jobs) are generated from the client PCs 102, 103, and 104 and the portable PC 108, the job information regarding the print jobs is stored and IP (Internet Protocol) information of the network printer 105 and information of the print job in the network printer 105 are notified to the client PC.

The network printer 105 is connected to the network 106 via the network interface, converts print data which is transmitted from the client PC into a dot image one page by one, and prints it every page. The network 106 is connected to the client PCs 102, 103, and 104, portable PC 108, server 101, network printer 105, and the like.

As mentioned above, by bearing its share of a role by the server 101, client PCs 102, 103, and 104, portable PC 108, and network printer 105, the client PC is effectively used and a process to reduce a burden on the network is performed.

Figure 3:
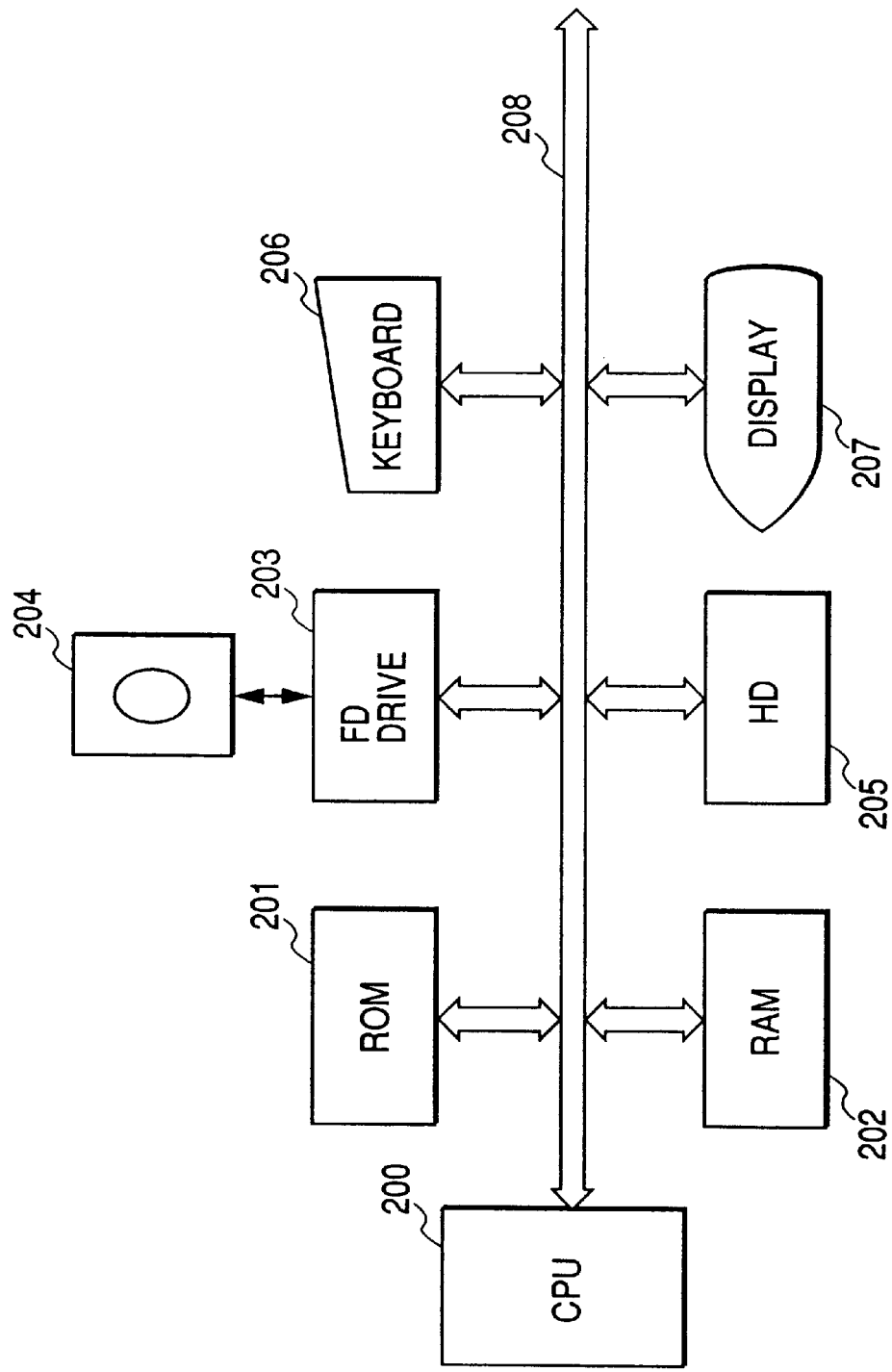
FIG. 3 is a block diagram showing a schematic construction of the client computer.

FIG. 3 is a block diagram showing a schematic construction of the client PC 102 according to the embodiment of the invention. Each of the client PCs 103 and 104 and the portable PC 108 also has the same construction as that of the client PC 102. The client PC 102 according to the embodiment of the invention comprises: a CPU 200; an ROM 201; an RAM 202; an FD (floppy disk) drive 203; an FD 204; an HD (hard disk) 205; a keyboard 206; a display 207; and a system bus 208.

Figure 6:
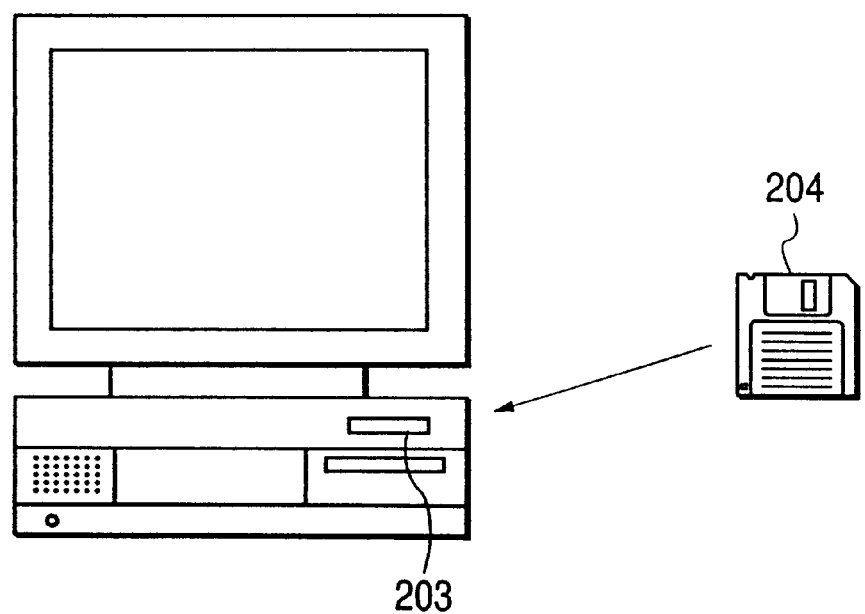
FIG. 6 is an explanatory diagram showing a concept in which the program is supplied from the FD to the client computer.

The construction of each unit will now be described in detail. The CPU 200 executes an application program, a printer driver program, an OS (Operating System), a network printer control program, or the like stored on the HD 205 and controls so as to temporarily store information, files, and the like which are necessary to execute the program into the RAM 202. A program such as a basic I/O program or the like and various data such as font data, template data, etc. which are used at the time of a document process are stored into the ROM 201. The RAM 202 functions as a main memory, a work area, or the like of the CPU 200. As shown in FIG. 6, the FD drive 203 can load a network printer control program or the like including the present print data transmitting program stored in the FD 204 into the computer system through the FD drive 203 equipped for the computer.

Figure 5:
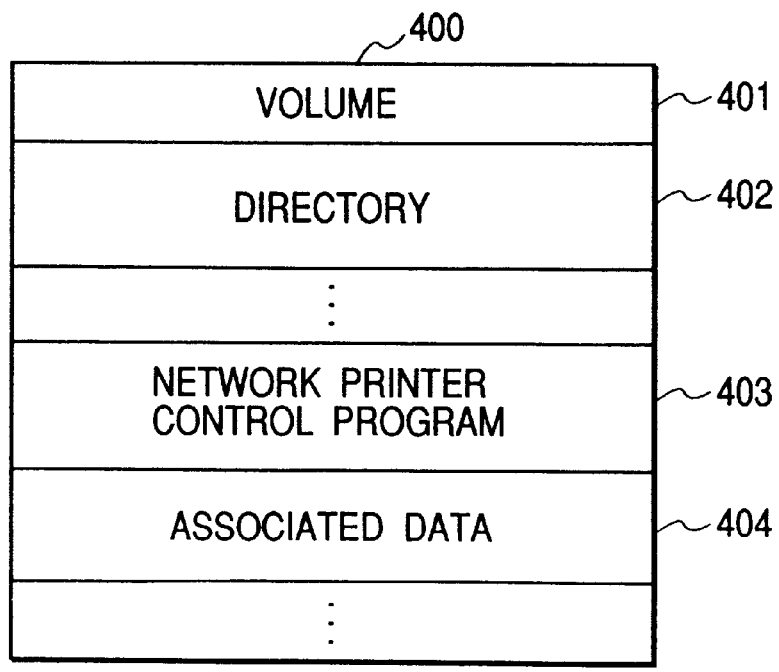
FIG. 5 is an explanatory diagram showing data in the FD of the client computer.

The FD 204 stores a printer driver program and the like and can be used as a memory means, as well as the HD 205. FIG. 5 shows a construction of the contents stored in the FD 204. In FIG. 5, reference numeral 400 denotes data contents in the FD 204; 401 volume information showing a construction of the data; 402 directory information; 403 a network printer control program converted into program codes on the basis of a flowchart of such a program, which will be explained in the embodiment; and 404 its associated data.

The application program, printer driver program, OS, network printer control program, associated program, and the like have been stored on the HD 205. The keyboard 206 is used for the user to input and instruct a device control command or the like for the client PC. The display 207 displays a command inputted from the keyboard 206, a printer status, and the like. The system bus 208 is used to control data flow in the client PC.

Although the embodiment shows an example in which the network printer control program and its associated data are directly loaded from the FD 204 into the RAM 202 and are executed, as another example, each time the network control program is made operative from the FD 204, it can be loaded from the HD 205 into the RAM 202. A medium to record the present network printer control program is not limited to the FD but may be a CD-ROM, an IC memory card, or the like. Further, the present network printer control program can be recorded into the ROM 201 and used as a part of a memory map and directly executed by the CPU 200.

Figure 4:
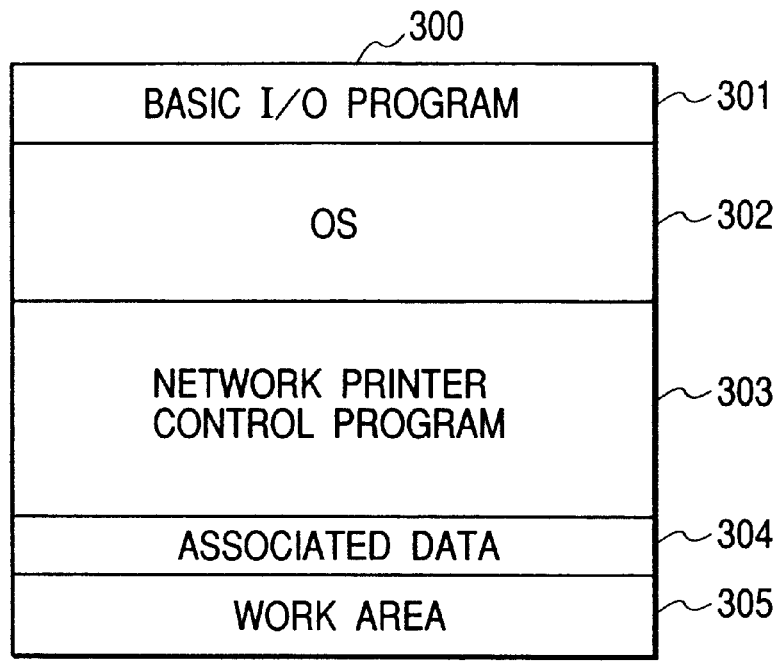
FIG. 4 is an explanatory diagram showing a memory map when a program is developed from an FD into an RAM of the client computer.

FIG. 4 shows a memory map of a status where the present network printer control program is loaded into the RAM 202 and can be executed. Reference numeral 301 denotes a basic I/O program which is an area in which a program having an IPL (Initial Program Loading) function or the like such that when a power source of the control apparatus is turned on, the OS is read out from and HD 205 and loaded into the RAM 202 and the operation of the OS is started has been stored. Reference numeral 302 denotes an OS. The network printer control program is developed in an area 303 and associated data is developed in an area 304. Reference numeral 305 denotes a work area in which the CPU 200 executes the present network printer control program.

Figure 7:
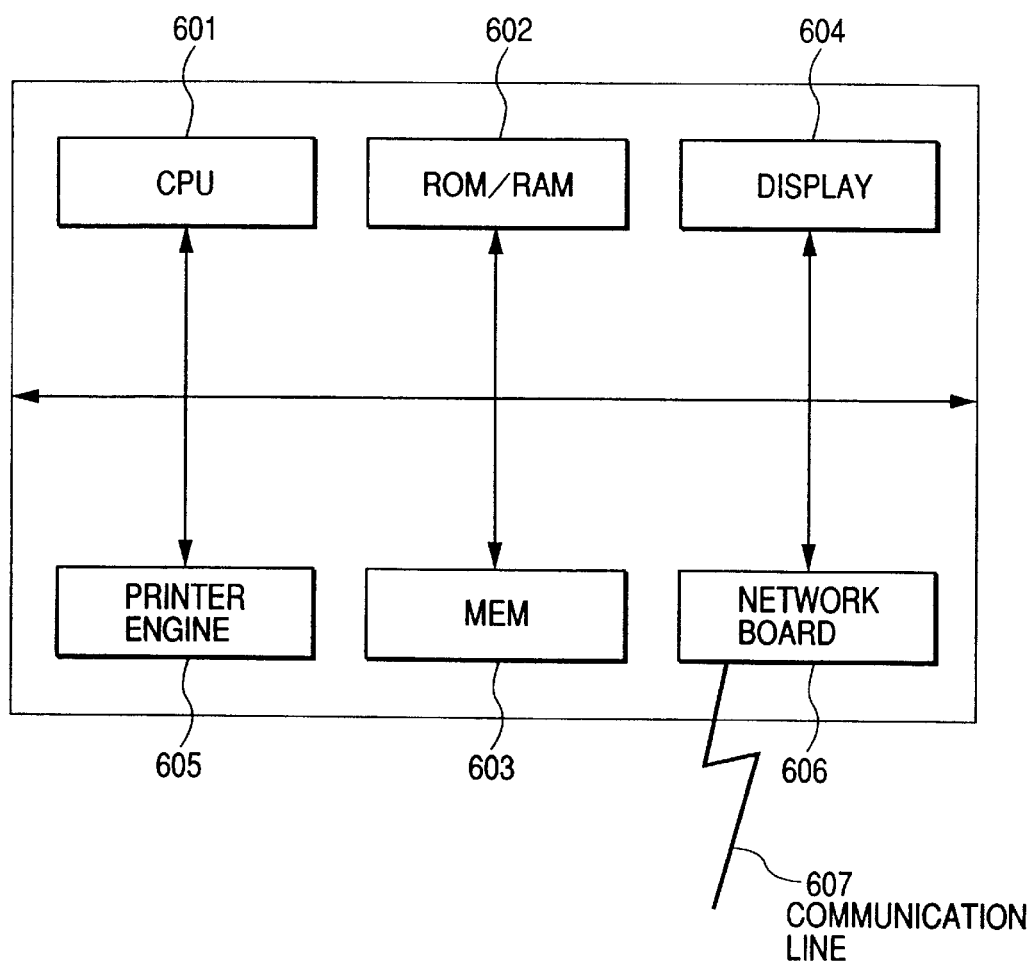
FIG. 7 is a block diagram showing a schematic construction of a network printer.

FIG. 7 is a block diagram showing a schematic construction of the network printer 105 according to the embodiment of the invention. The network printer 105 according to the embodiment of the invention comprises: a CPU 601; an ROM/RAM 602; a memory 603; a display 604; a printer engine 605; a network board 606; and a communication line 607. In the embodiment, although a laser beam printer (LBP) is used as a network printer, the invention is not limited to it but a printer of another system can be obviously used.

A construction of each of the above sections will now be described in detail. The CPU 601 controls the whole apparatus. The ROM/RAM 602 includes buffers for temporarily storing a control program to control the CPU 601, constant data, and transmission and reception data. The memory 603 is memory means such as a hard disk and stores data to be transmitted and received, the control program which is executed by the CPU 601, and data. The display 604 displays the contents of the data temporarily stored in the ROM/RAM 602 or the data stored in the memory 603, an operating situation, or the like. The printer engine 605 prints and outputs bit map data formed by the CPU 601 on the basis of the program stored in the ROM/RAM 602. Data information such as print data, job information, or the like is communicated with an external apparatus such as client PC, server, or the like through the network board 606. The network board 606 and network 106 are connected via the communication line 607.

Figure 1:
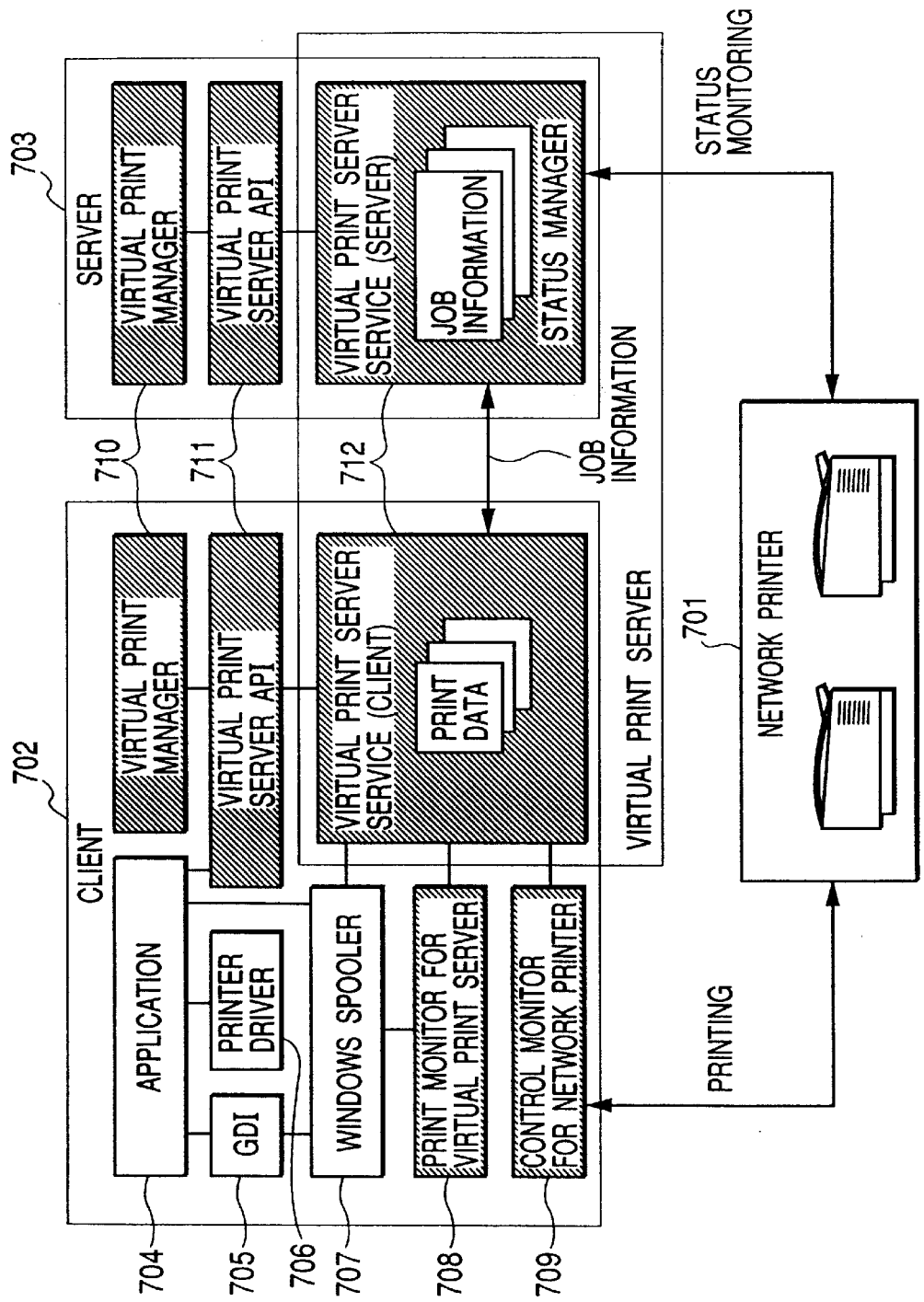
FIG. 1 is a block diagram showing a software module construction of a client computer and a server.

FIG. 1 is a block diagram showing a software module construction of the client PC (also including the portable PC) and server according to the embodiment of the invention. Those software modules are supplied from, for example, the FD. A software module 702 of the client PC according to the embodiment of the invention comprises: an application module 704 to issue a print instruction to the network print system of the invention; a GDI (Graphical Device Interface) 705 of Windows (registered trade name); a printer driver 706 which is built in Windows; a print spooler (Windows spooler) 707 in Windows; a print monitor 708 for a virtual print server; a control monitor 709 for a network printer; a virtual print manager 710; a virtual print server API (Application Interface) 711; and a virtual print server service 712.

The software module 703 of the server according to the embodiment of the invention comprises the virtual print manager 710, virtual print server API 711, and virtual print server service 712. In the diagram, reference numeral 701 denotes a plurality of network printers connected to the network.

In this case, there are the following correspondence relations between each of the above sections in the embodiment of the invention and each component requirement in Claims. The network printer corresponds to the printing apparatus. The server corresponds to the upper apparatus. The client PC (portable PC) corresponds to the external apparatus. The virtual print server service (client) 712 corresponds to the upper apparatus detecting means and print requesting means. The virtual print server service (server) 712 corresponds to the printing apparatus detecting means and registering means.

The software module of the client PC and the software module of the server construct a system of the virtual print server according to the invention and are supplied from a storage medium, in the embodiment, from the FD 204. As mentioned above, the virtual print manager 710, virtual print server API 711, and virtual print server service 712 exist in both the client PC and the server. A combination of the virtual print server service (client) and virtual print server service (server) constructing the virtual print server service 712 is called a virtual print server and this system is called a virtual print server system hereinbelow.

Figure 8:
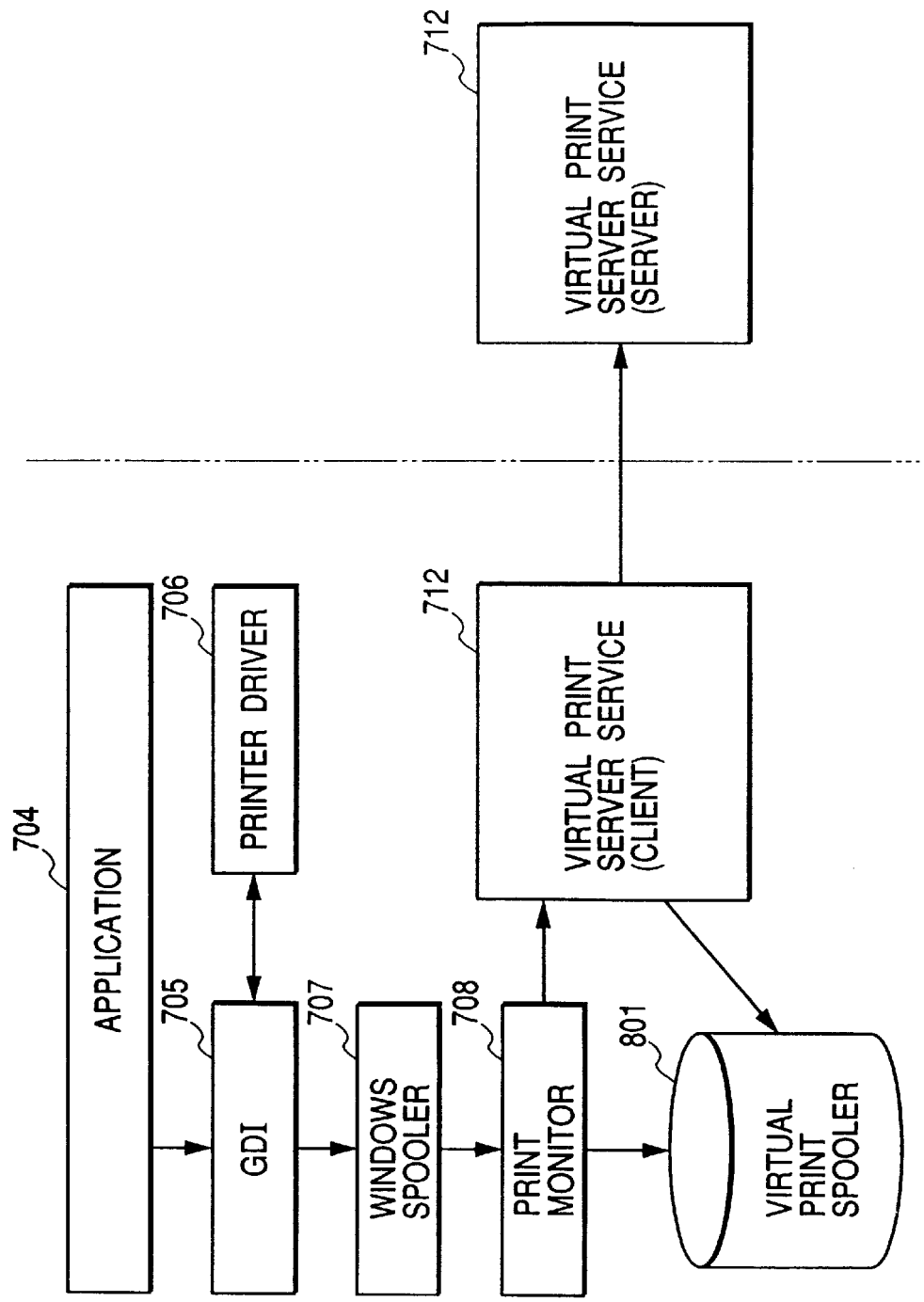
FIG. 8 is a block diagram showing a flow of a printing process when a print is requested from the client computer to the server.
Figure 9:
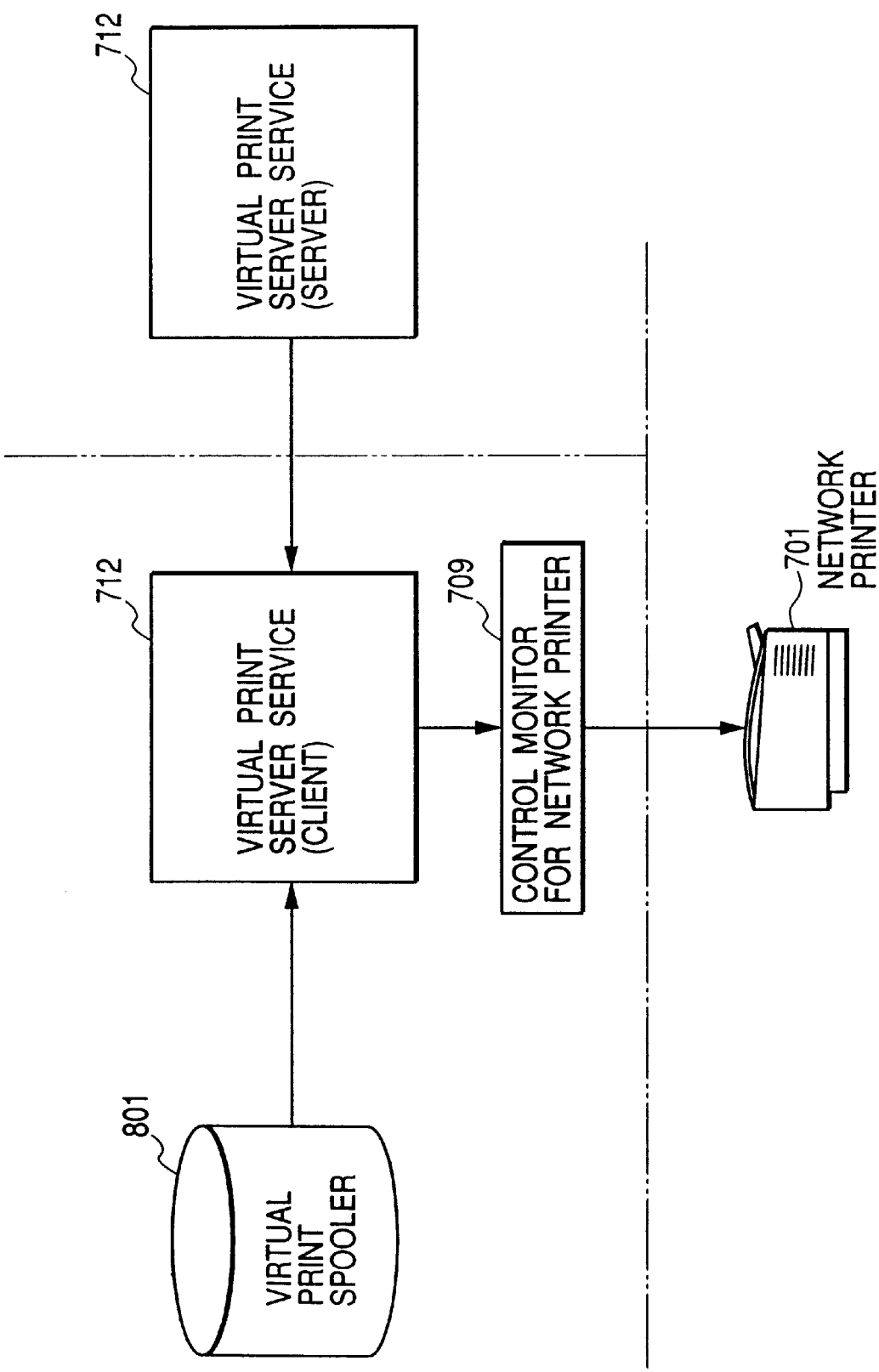
FIG. 9 is a block diagram showing a flow of a printing process when print data is transmitted to the network printer after a print possible instruction was supplied from the server to the client computer.

In the above construction, the operation for allowing the network printer 105 to print by the client PC 102 or portable PC 108 will now be described. In the embodiment, explanation will be made with respect to Windows as an example. FIG. 8 shows a flow of a printing process when the client PC issues a print request to the server. FIG. 9 shows a flow of a printing process when the client PC obtains a print permission from the server and transmits print data to the network printer. It is now assumed that the block diagrams which have already been described above will be successively explained by using the same reference numerals. The flow of the printing process will be described with reference to FIGS. 8 and 9.

FIG. 8 shows a flow of the printing process when the client PC issues a print request to the server. First, the application 704 starts the print via the GDI 705. The GDI 705 notifies the Windows spooler 707 and print monitor 708 for the virtual print server of the start of the print. The print monitor 708 for the virtual print server which received the notification to start the print notifies the virtual print server service (server) 712 existing on the server 703 (101) of the instruction to start the storage of the print data via the virtual print server service (client) 712. The GDI 705 requests the printer driver 706 to convert the print data into a printer language. The print data converted to the printer language is spooled into the Windows spooler 707.

The print monitor 708 for the virtual print server receives the print data spooled in the Windows spooler 707 from the Windows spooler 707 and sends the print data to the virtual print server service (client) 712. The virtual print server service (client) 712 temporarily stores the received print data into a temporary file (not shown) in a virtual print spooler 801 (refer to FIG. 8) in the HD 205 in FIG. 3. At a point when all print data has been stored in the temporary file in the virtual print spooler 801 in the HD 205, the virtual print server service (client) 712 notifies the virtual print server service (server) 712 on the server 703 (101) of the end of storage of the print data and requests a print permission to the virtual print server service (server) 712. As for the virtual print server service 712, the same module is used for both the client PC and the server and they are switched to the module for the client or the module for the server by setting.

FIG. 9 is a diagram showing the operation until the print job already registered in the virtual print server service 712 reaches a printing order and the print data is actually transmitted to the network printer. The virtual print server service (server) 712 notifies the client PC which reached the printing order of the print permission. As mentioned above, the virtual print server service (client) 712 which received the print permission instruction reads out the print data temporarily stored in the virtual print spooler 801 and transfers it to the control monitor 709 for the network printer. The control monitor 709 transmits the print data to the network printer 701 via a print communication protocol, thereby allowing the network printer 701 to print it.

Figure 10:
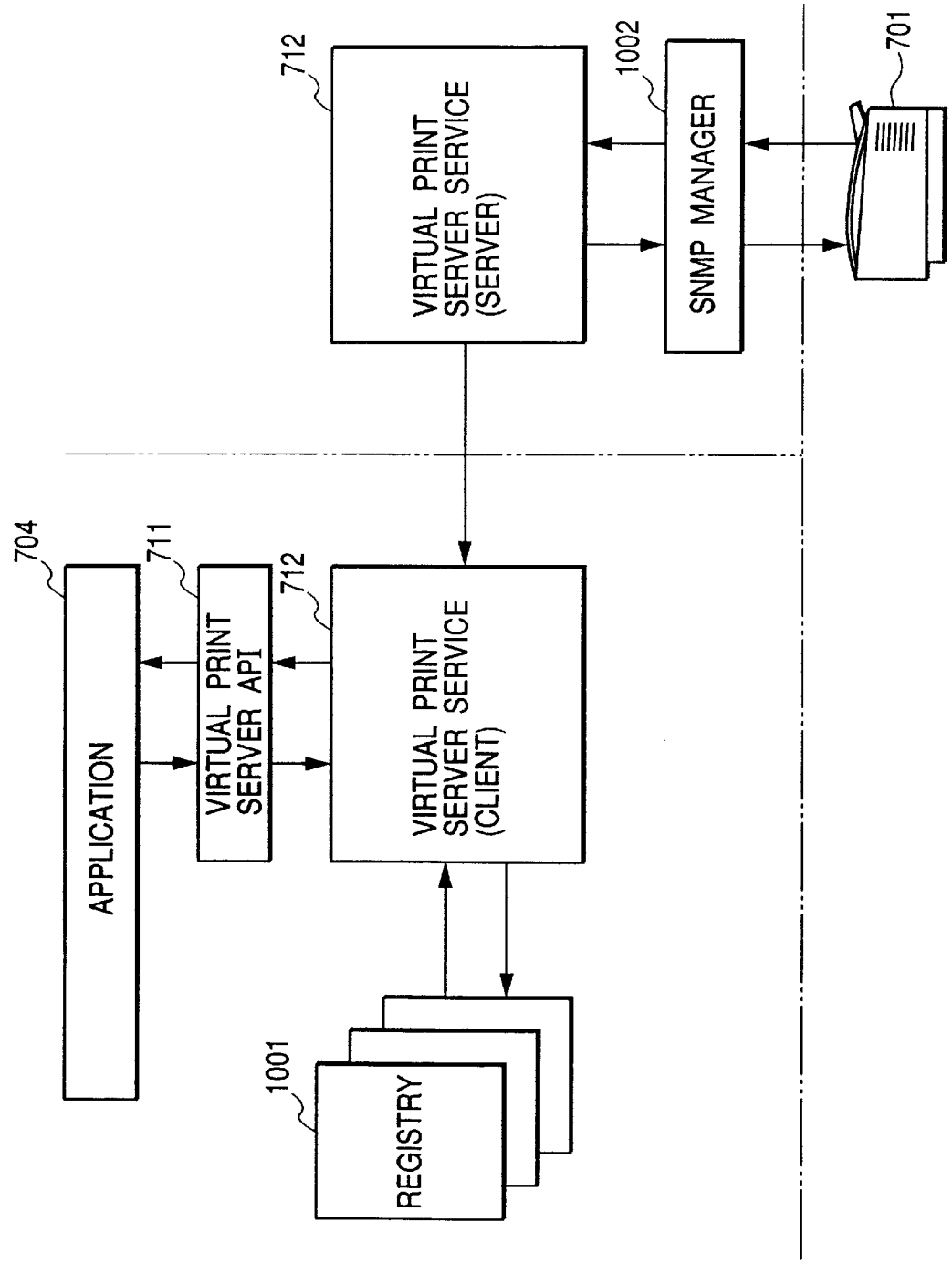
FIG. 10 is a block diagram showing a flow of a printer status in a virtual server system.

The operation such that the server notifies the client PC of a printer status of the network printer 701 will now be described with respect to Windows as an example. FIG. 10 shows a flow of the printer status.

In the embodiment, the virtual print server service (server) 712 requests an SNMP (Simple Network Management Protocol) manager 1002 to collect the status of the network printer 701 at intervals of 5 seconds (default). The SNMP manager 1002 requests a status collecting request to the network printer 701. The network printer 701 returns the current status. When the status of the network printer 701 changes, the virtual print server service (server) 712 notifies the client PC using the network printer 701 of the status change.

The virtual print server service (client) 712 in the client PC receives the change notice of the printer status generated from the server. The printer status is stored in a registry 1001 existing in the RAM in the client PC. The application 704 can obtain the printer status stored in the registry 1001 via the virtual print server API 711. The application 704 displays the printer status for the user, thereby notifying of the printer status.

The embodiment relates to a case of using Windows NT (registered trade name). Among the above component elements, the print monitor 708 for the virtual print server, virtual print spooler 801, virtual print server service (client/server) 712, and control monitor 709 for the network printer are component elements newly formed in the invention. The other component elements are standard modules in Windows NT. However, the invention is not limited to them but can be constructed by another OS such as OS/2.

Figure 11:
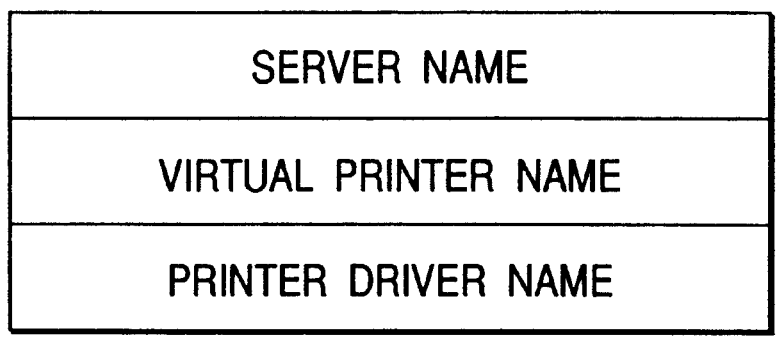
FIG. 11 is an explanatory diagram showing a printer information table.

In the network print system having the foregoing construction according to the embodiment of the invention, the virtual print server service (client) usually holds printer information as shown in FIG. 11. The printer information includes a server name, a virtual printer name, and a printer driver name. The server name is a name of the server in which the virtual print server service (server) is operating. The virtual printer name is a virtual printer name of the printer on the network which is managed by the virtual print server service (server). The printer driver name is a name of the printer driver to generate print data that is actually transmitted to the printer.

The client PC connected to the network holds the printer information, thereby enabling the printer on the network to print. However, the portable PC usually doesn't have the server name and virtual printer name on the network. In the portable PC, therefore, "UNKNOWN" indicating that the server name is unknown is set as a server name and "DEFAULT" showing that the default printer is used is set as a virtual printer name. The printer driver name is set into an arbitrary printer driver name installed in the portable PC.

Figures 21, 22:
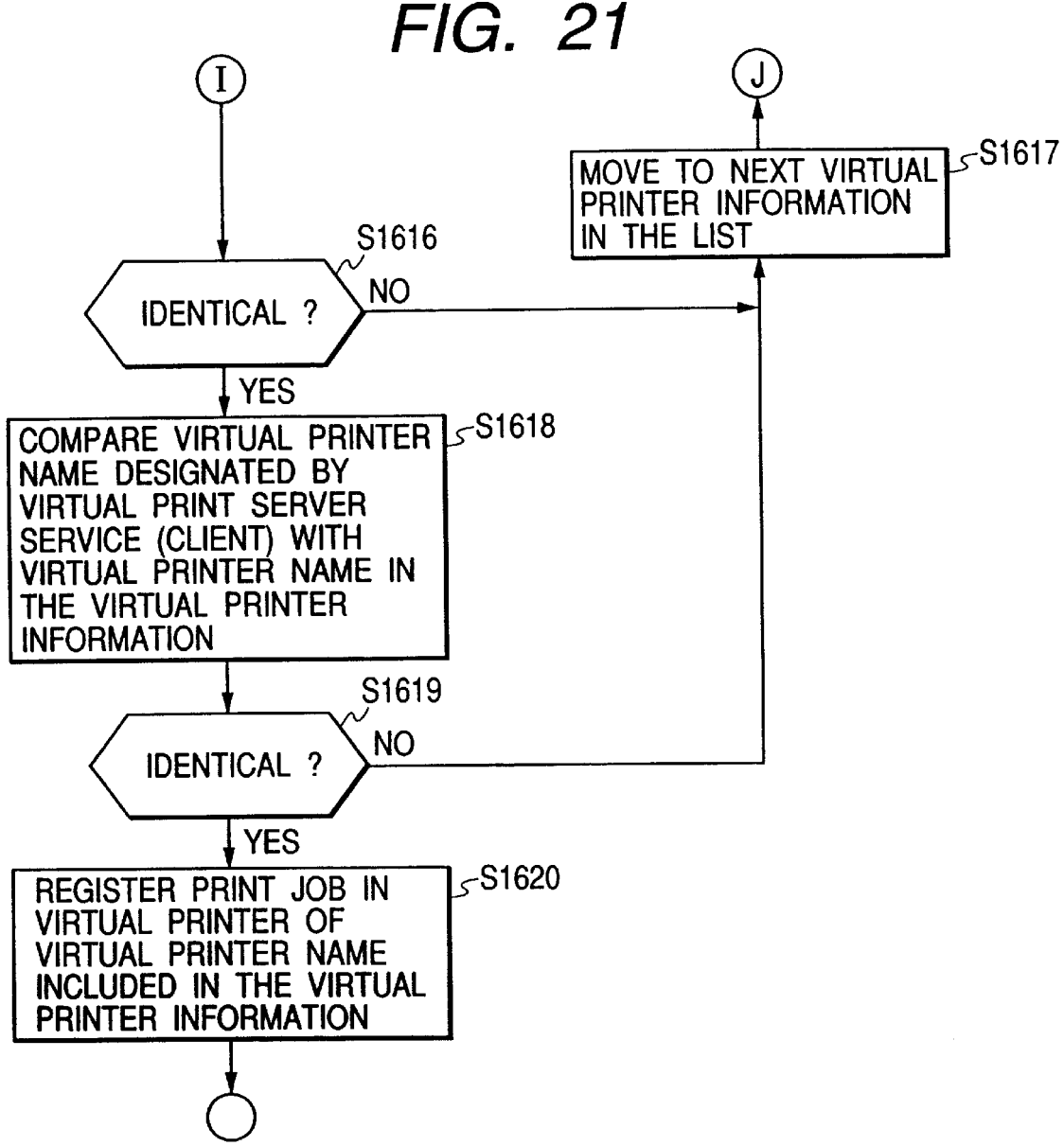
FIG. 21 is a flowchart showing processes for allowing the server in the virtual server system to register a print job by the print request from the client computer.
FIG. 22 is an explanatory diagram showing a set picture plane to form a port on the client side of the virtual print server.

FIG. 22 shows a picture plane when the user designates "UNKNOWN" in the server name, designates "DEFAULT" in the virtual printer name, and forms a printer object "LPRINTER". In the picture plane of FIG. 22, the user inputs "UNKNOWN" into the server name, inputs "DEFAULT" into the virtual printer name, and forms a port.

Figure 24:
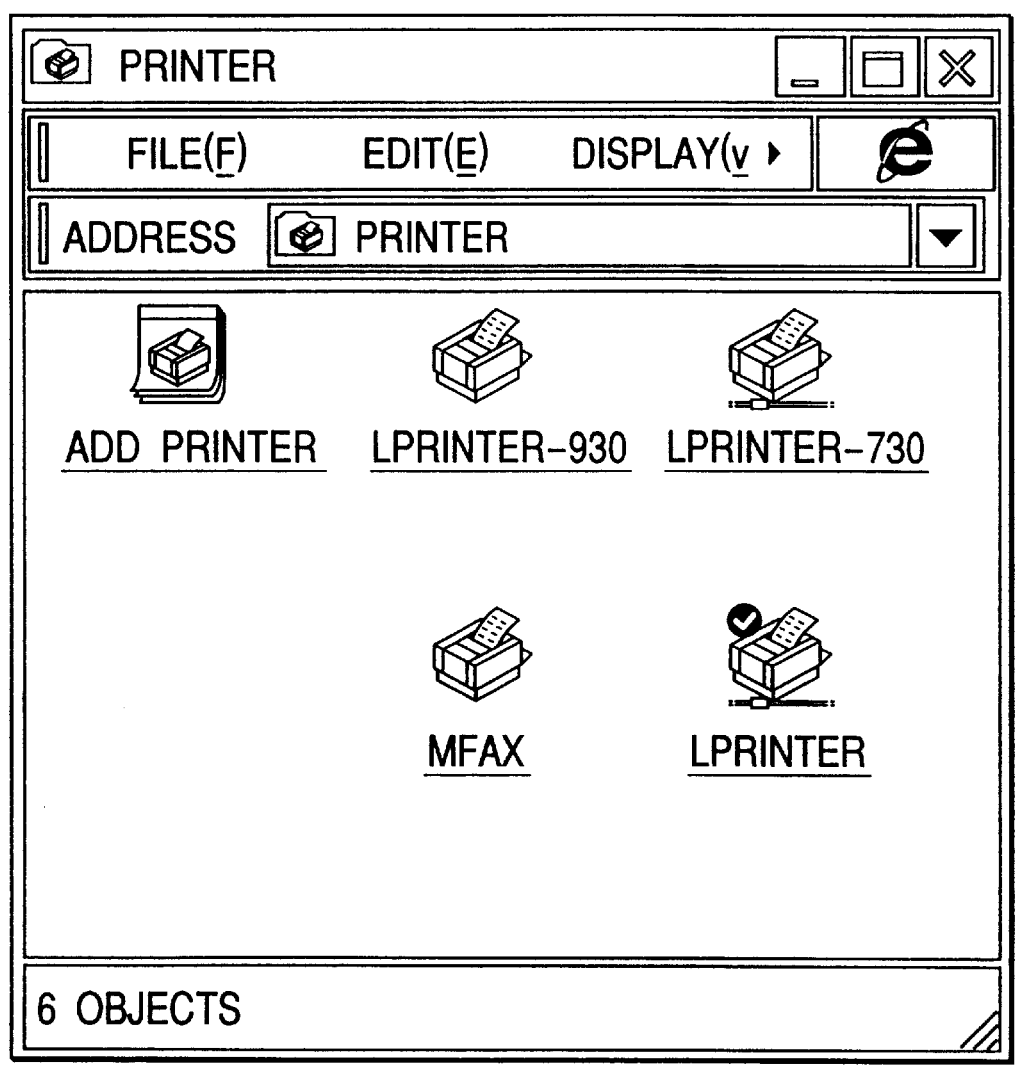
FIG. 24 is a diagram showing an example of printer objects.

The operation to designate "UNKNOWN" into the server name denotes that there is no designation of the server. Similarly, the operation to designate "DEFAULT" into the virtual printer name denotes that there is no designation of the virtual printer. In the picture plane of FIG. 23, this port is selected as a print destination of the printer object "LPRINTER". Thus, the printer object "LPRINTER" is formed as shown in FIG. 24.

Although the user designates "DEFAULT" as a virtual printer name here, a virtual printer name ("LPRINTER-730" in FIG. 23) on the network which is managed by the virtual print server service (server) can be specifically designated.

When the user does not designate the server name and virtual printer name, the server name and the virtual printer name are automatically set to "UNKNOWN" and "DEFAULT", respectively.

Figure 25:
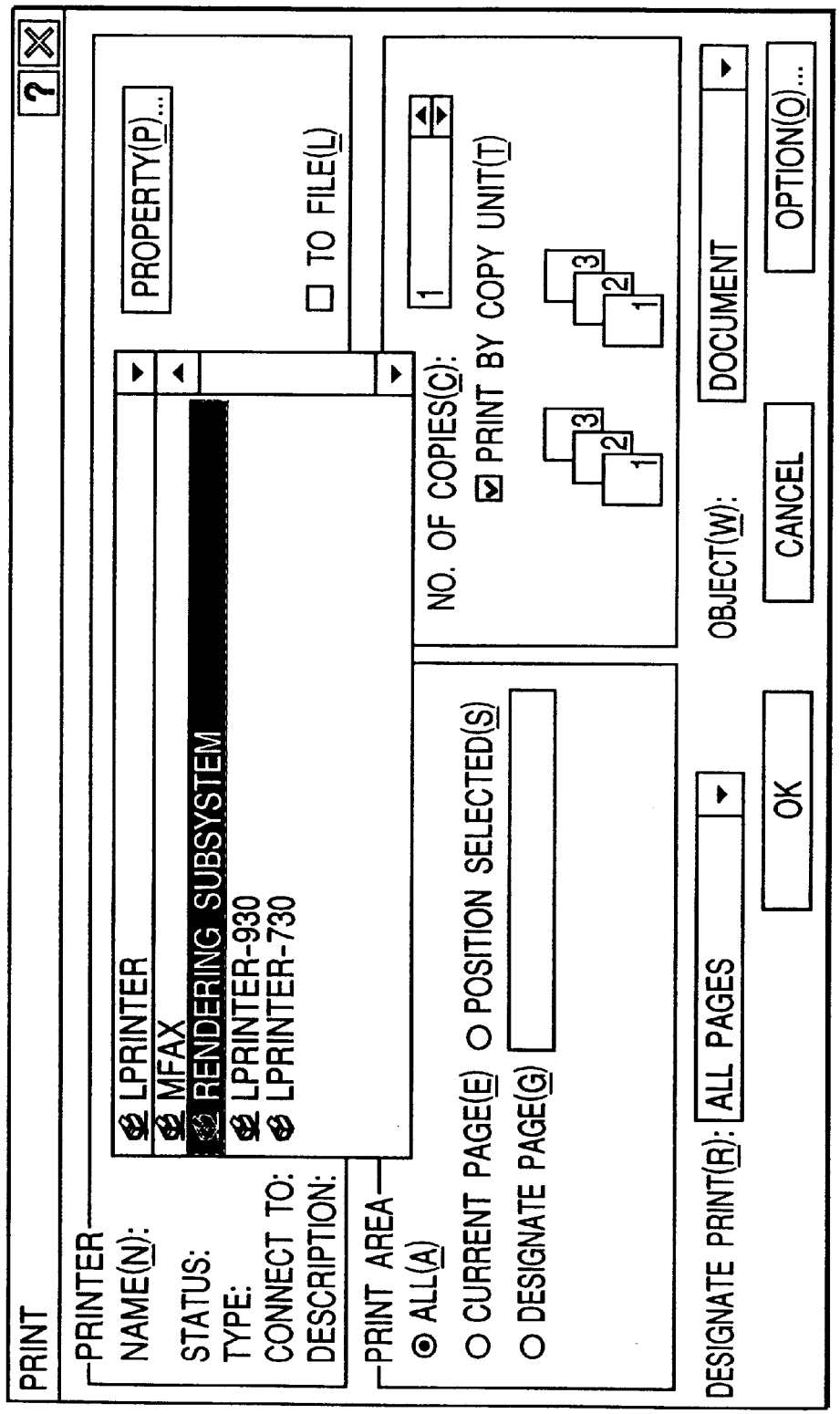
FIG. 25 is a diagram showing a picture plane to select a printer object.

When the user issues a print instruction by an application, a printer object is selected on a print picture plane as shown in FIG. 25. Besides the printer object "LPRINTER" mentioned above, printer objects such as "LPRINTER-730", "LPRINTER-920", and the like are listed up here.

Figure 12:
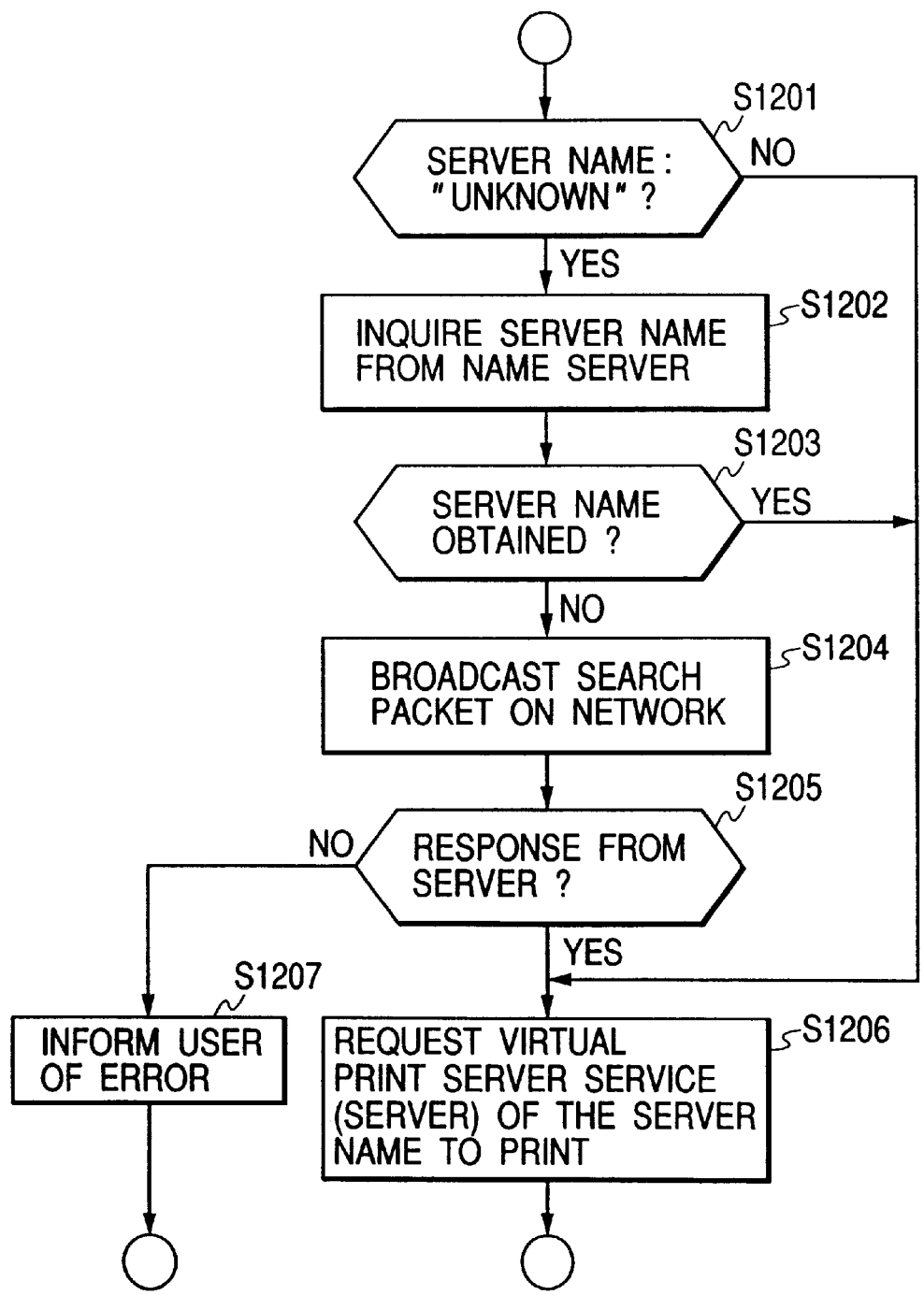
FIG. 12 is a flowchart showing processes for allowing the client computer in the virtual server system to issue a print request to the server.

FIG. 12 is a flowchart showing a flow of processes of the virtual print server service (client) when the user selects the printer object "LPRINTER" by the application and issues a print instruction. In the printer object "LPRINTER", "UNKNOWN" is set in the server name and "DEFAULT" is set in the virtual printer name.

When the print instruction is received from the user, the virtual print server service (client) discriminates whether the server name in the printer information is "UNKNOWN" or not (step S1201). Unless the server name is "UNKNOWN", the print request is issued to the virtual print server service (server) having the server name (step S1206).

On the other hand, if the server name is "UNKNOWN", it is inquired whether the server name has been registered for the name server or not (step S1202). A check is made to see if the server name could be obtained from the name server (step S1203). If the server name can be obtained, the print request is issued to the virtual print server service (server) having the obtained server name (step S1206). On the other hand, if the server name cannot be obtained, a search packet is broadcasted on the network (step S1204). The search packet is a packet to request a response to the virtual print server service (server) on the network.

The presence or absence of a response from the server is discriminated (step S1205). If there is no response from the server, a message indicating that the server cannot be found is notified to the print monitor as an error. The print monitor notifies the spooler of such a message. The spooler displays so as to notify the user of such a message (step S1207).

When it is determined that there is a response from the server, the print request is issued to the server which responded (step S1206).

When the print request is issued to the server in step S1206, the virtual printer name (the virtual printer name is "DEFAULT" here) and the printer driver name in the printer information are transmitted to the server.

Figure 13:
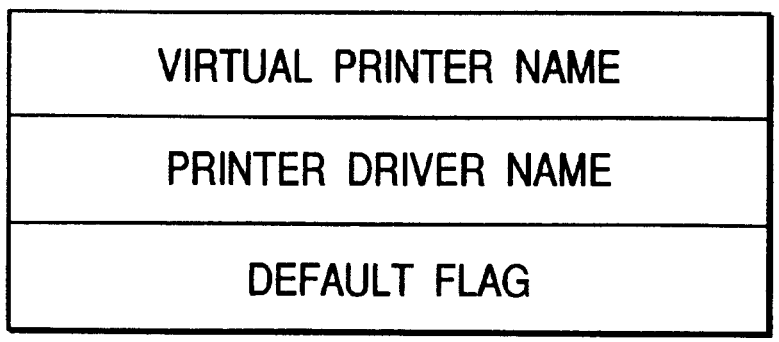
FIG. 13 is an explanatory diagram showing a virtual printer information table.

The virtual print server service (server) holds virtual printer information as shown in FIG. 13. The virtual printer information includes: the virtual printer name of each of the virtual printers which are managed by the virtual print server service (server); the printer driver name which is necessary when the print is performed by the virtual printer; and a default flag indicating whether the virtual printer has been designated as a default printer or not.

The virtual printer information is managed as a virtual printer information list. The virtual print server service (server) searches the list if necessary and can extract desired virtual printer information.

In a picture plane as shown in FIG. 14, the manager of the server can designate each of the virtual printers which are managed by the virtual print server service (server) as a default printer. Only one default printer can be selected from the virtual printers having the same printer driver name.

Figure 15:
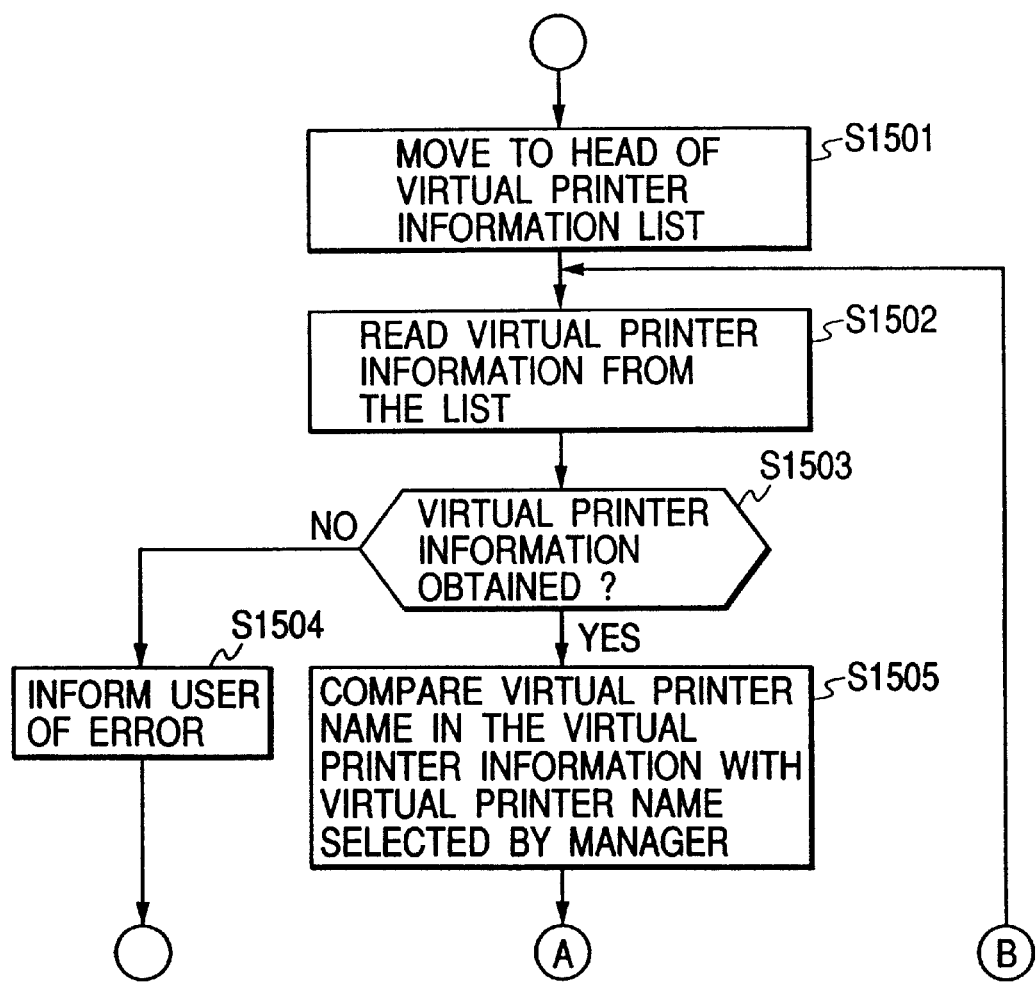
FIG. 15 is a flowchart showing processes to set the default printer in the virtual server system.
Figure 16:
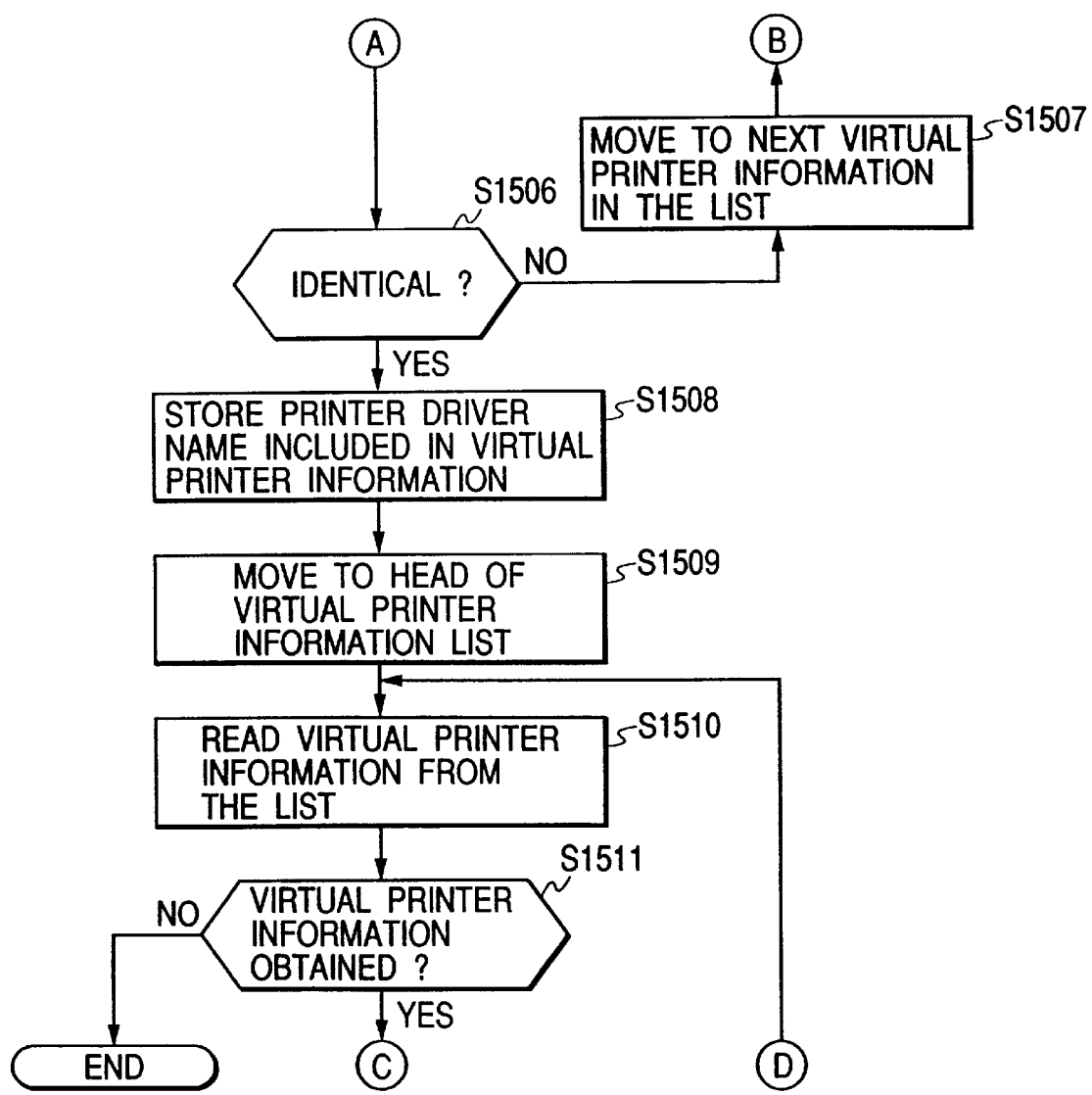
FIG. 16 is a flowchart showing processes to set the default printer in the virtual server system.
Figure 17:
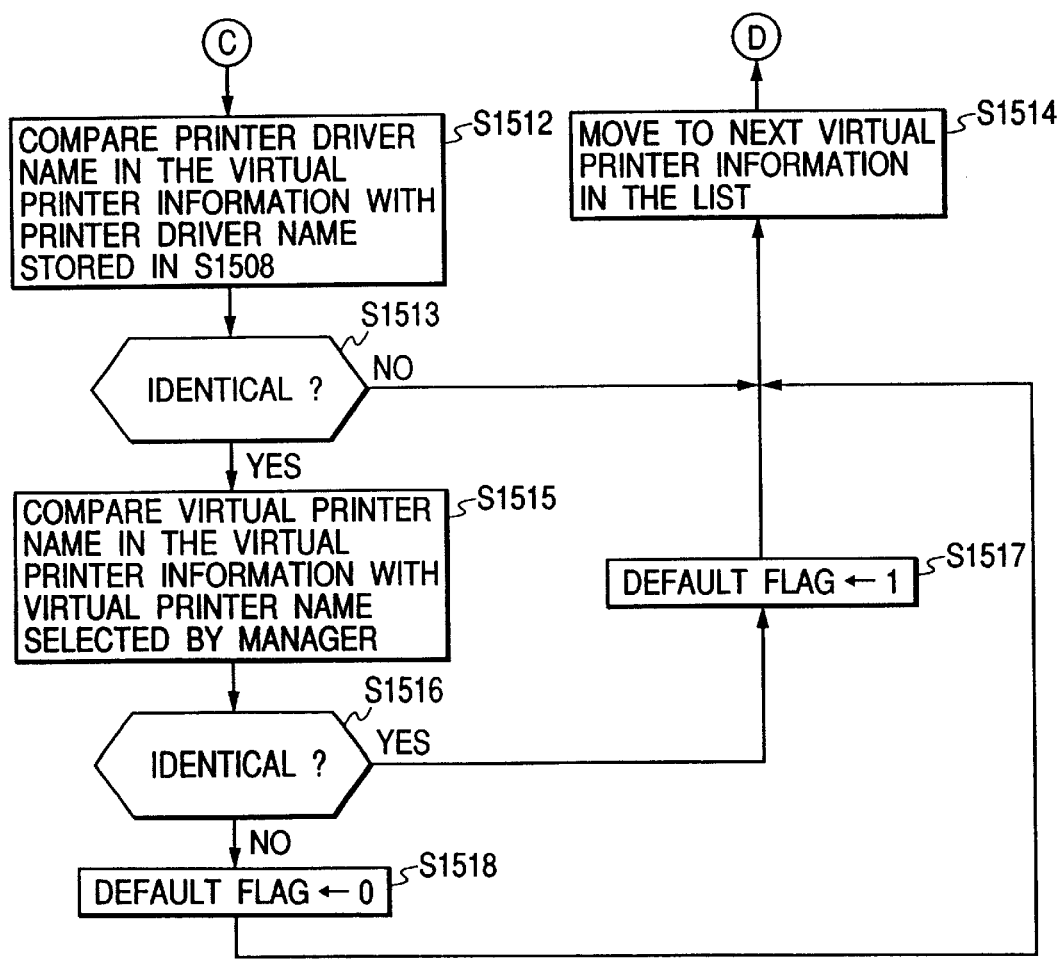
FIG. 17 is a flowchart showing processes to set the default printer in the virtual server system.
Figure 18:
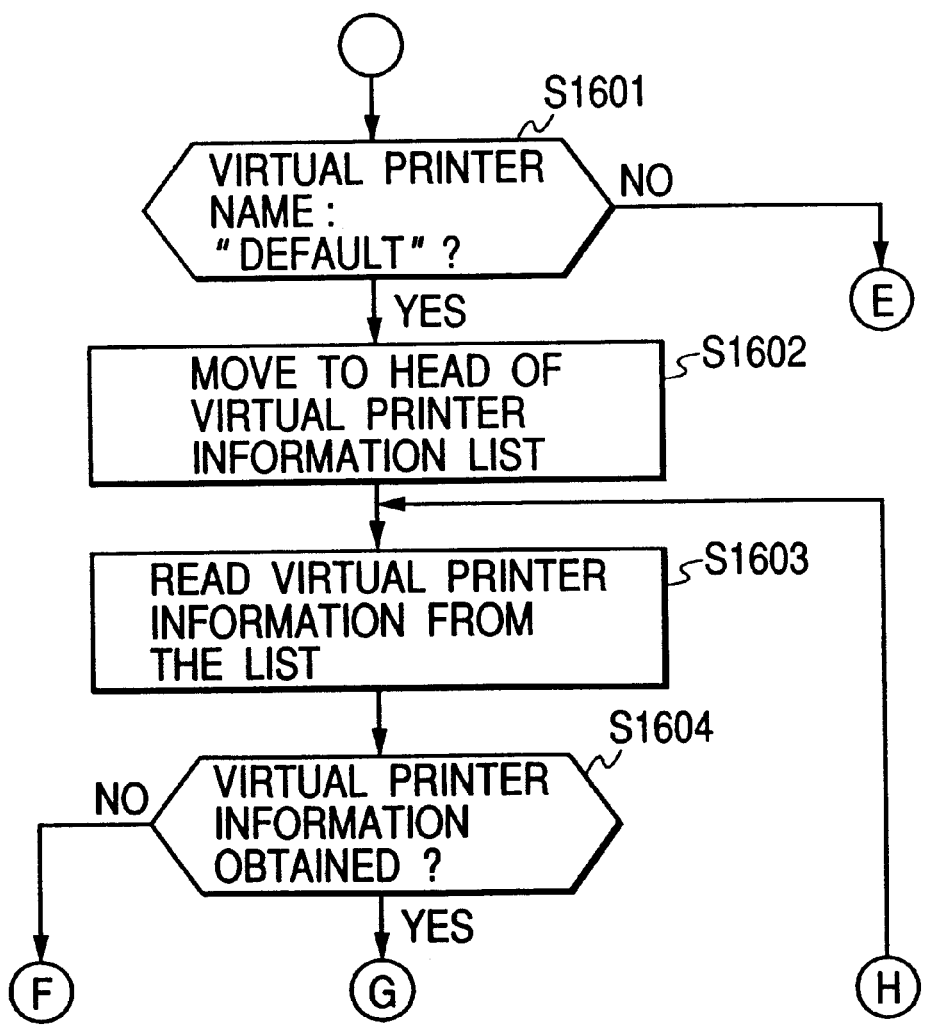
FIG. 18 is a flowchart showing processes for allowing the server in the virtual server system to register a print job by a print request from the client computer.
Figure 19:
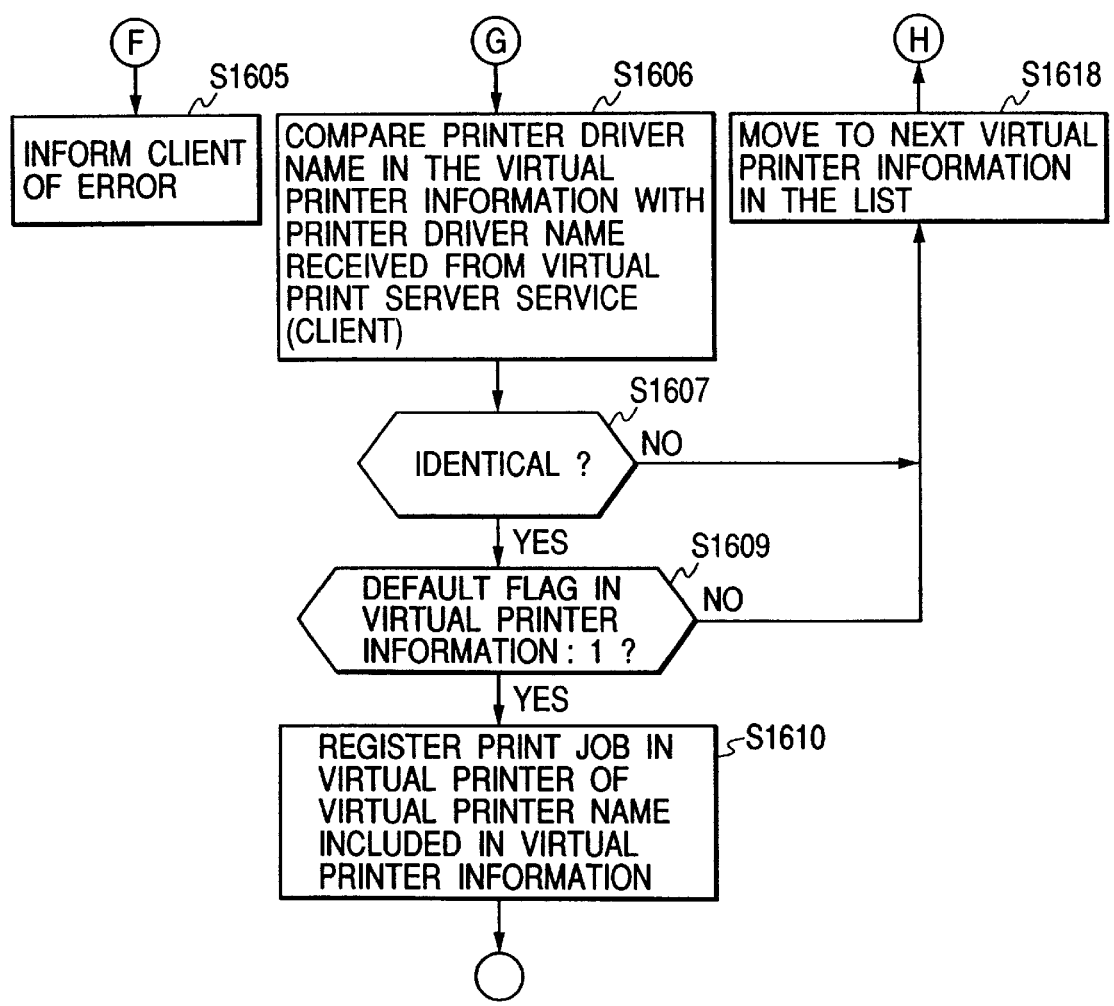
FIG. 19 is a flowchart showing processes for allowing the server in the virtual server system to register a print job by the print request from the client computer.
Figure 20:
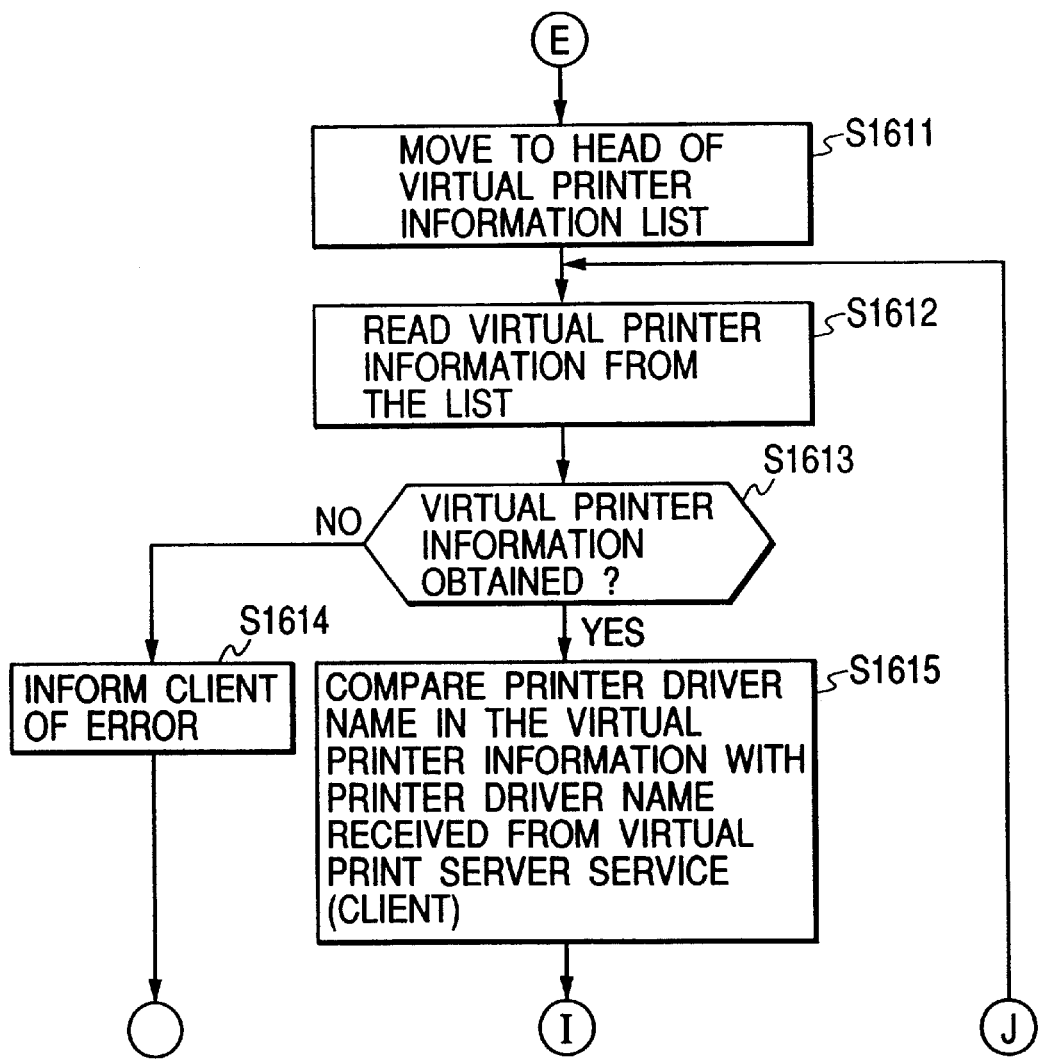
FIG. 20 is a flowchart showing processes for allowing the server in the virtual server system to register a print job by the print request from the client computer.

FIGS. 15 to 17 are flowcharts showing a flow of processes of the virtual print server service (server) when the manager of the server selects the virtual printer as a default printer.

First, a target is moved to the head of the virtual printer information list (step S1501) and the virtual printer information is extracted from the virtual printer information list (step S1502). A check is made to see if the virtual printer information could be extracted (step S1503).

When the virtual printer information cannot be extracted, a message showing that the virtual printer selected by the manager is not found is notified to the user (step S1504). On the other hand, if the virtual printer information can be obtained, the virtual printer name included in the virtual printer information is compared with the virtual printer name selected by the manager (step S1505). Whether those virtual printer names are the same or not is discriminated (step S1506). If NO, the target is moved to the next virtual printer information in the list (step S1507) and the processing routine is returned to step S1502.

If the virtual printer names are the same, the printer driver name included in the virtual printer information is stored (step S1508).

Subsequently, the target is again moved to the head of the virtual printer information list (step S1509) and the virtual printer information is extracted from the virtual printer information list (step S1510). Whether the virtual printer information could be extracted or not is discriminated (step S1511).

When the virtual printer information cannot be obtained, the processing routine is finished. If the virtual printer information can be obtained, the printer driver name included in the virtual printer information is compared with the printer driver name stored in step S1508 (step S1512). Whether the printer driver names are the same or not is discriminated (step S1513). If they are different, the target is moved to the next virtual printer information in the list (step S1514). The processing routine is returned to step S1510.

If the printer driver names are the same, the virtual printer name included in the virtual printer information is compared with the virtual printer name selected by the manager (step S1515). If they are the same (S1516), a default flag included in the virtual printer information is set to "1" (S1517). The processing routine is returned to step S1510 via step S1514. If the virtual printer names are different (S1516), the default flag included in the virtual printer information is set to "0" (S1518). The processing routine is returned to step S1510 via step S1514.

FIGS. 18 to 21 are flowcharts showing a flow of processes when the virtual print server service (server) receives the print request from the virtual print server service (client).

When the print request is received from the virtual print server service (client), the virtual print server service (server) discriminates whether the virtual printer name designated by the virtual print server service (client) is "DEFAULT" or not (step S1601). If the virtual printer name is not "DEFAULT", a registering process of the print job is performed for the designated virtual printer (step S1611).

If the virtual printer name is "DEFAULT", the target is moved to the head of the virtual printer information list (step S1602). The virtual printer information list is searched and the virtual printer in which the default flag is equal to "1" is searched.

The virtual printer information is extracted from the virtual printer information list (step S1603) and a check is made to see if the virtual printer information has been extracted (step S1604). If the virtual printer information cannot be obtained, an error that the default printer is not set is notified to the virtual print server service (client) (step S1605).

If it is determined that the virtual printer information could be obtained, the printer driver name included in the virtual printer information is compared with the printer driver name transmitted from the virtual print server service (client) (step S1606).

Whether the printer driver names are the same or not is discriminated (step S1607). If the printer driver names are different, the target is moved to the next virtual printer information in the list (step S1608). The processing routine is returned to step S1603. If the printer driver names are the same, whether the default flag included in the virtual printer information is equal to "1" or not is discriminated (step S1609). If the default flag is equal to "1", the print job is registered into the virtual printer having the virtual printer name included in the virtual printer information (step S1610), thereby allowing the virtual printer to perform the printing process. If the default flag is not equal to "1", the processing routine is returned to step S1603 via step S1608.

When it is decided in step S1601 that the virtual printer name designated by the virtual print server service (client) is not "DEFAULT", the target is moved to the head of the virtual printer information list (step S1611). The virtual printer information having the designated virtual printer name is searched from the list.

The virtual printer information is extracted from the virtual printer information list (step S1612) and whether the virtual printer information could be extracted or not is discriminated (step S1613). If the virtual printer information cannot be obtained, an error that the designated virtual printer cannot be found is notified to the virtual print server service (client) (step S1614).

When it is decided that the virtual printer information could be obtained, the printer driver name included in the virtual printer information is compared with the printer driver name transmitted from the virtual print server service (client) (step S1615), thereby discriminating whether the printer driver names are the same or not (step S1616). If the printer driver names are different, the target is moved to the next virtual printer information in the list (step S1617). The processing routine is returned to step S1612. If the printer driver names are the same, the virtual printer name designated by the virtual print server service (client) is compared with the extracted virtual printer name included in the virtual printer information (step S1618), thereby discriminating whether the virtual printer names are the same or not (step S1619). If the virtual printer names are the same, the print job is registered into the virtual printer having the virtual printer name included in the virtual printer information (step S1620). If the virtual printer names are different, the processing routine is returned to step S1612 via step S1617.

While registering the print job into the virtual printer, the virtual print server service (server) schedules the print jobs registered in the virtual printer. While the print jobs are being scheduled, the print permission is sequentially issued to the virtual print server service (client).

As described above, according to the network print system of the embodiment of the invention, the client PC has the virtual print server service (client) 712 for searching the server on the network, designating the default network printer for the searched server, and issuing the print request. The server has the virtual print server service (server) 712 for searching the default network printer on the network on the basis of the print request from the client and registering the print job into the searched network printer, so that the following operation and effects are obtained.

In the above construction, when the print instruction is received from the user, if the server name in the printer information is not "UNKNOWN", the virtual print server service (client) 712 of the client PC issues a print request to the server having the server name. If the server name is "UNKNOWN", the virtual printer name and the printer driver name are designated and the print request is issued to the server registered in the name server or the server which made a response to the search packet.

When the virtual printer name designated from the client is "DEFAULT", the virtual print server service (server) 712 of the server which received the print request from the client searches the virtual printer information and searches the virtual printer in which the default flag is equal to "1". If the printer driver name included in the virtual printer information is the same as the printer driver name transmitted from the client and the default flag included in the virtual printer information is equal to "1", the print job is registered into the virtual printer of the virtual printer information.

If the virtual printer name designated from the client is not "DEFAULT", the virtual print server service (server) 712 of the server extracts the virtual printer information from the virtual printer information list. If the printer driver name included in the virtual printer information and the printer driver name transmitted from the client are the same and the virtual printer name designated from the client and the extracted virtual printer name included in the virtual printer information are the same, the print job is registered into the virtual printer of the virtual printer information.

In the embodiment of the invention, therefore, if the client (for example, portable PC) temporarily participates in the network and allows the printer connected to the network to print, there is an advantage such that the troublesome setting is unnecessary.

The invention can be applied to a system comprising a plurality of equipment or an apparatus comprising one equipment. It will be obviously understood that the invention is accomplished by a method such that a memory medium in which program codes of the software to realize the functions of the embodiment mentioned above have been stored is supplied to a system or an apparatus and a computer (or a CPU or an MPU) of the system or apparatus reads out the program codes stored in the memory medium and executes them.

In this case, the program codes themselves read out from the memory medium realize the functions of the foregoing embodiment and the memory medium in which the program codes have been stored constructs the invention.

As a memory medium to supply the program codes, for example, it is possible to use a floppy disk, a hard disk, an optical disk, a magnetooptical disk, a CD-ROM, a CD-R, a magnetic tape, a non-volatile memory card, an ROM, or the like.

It will be obviously understood that the invention incorporates not only a case where a computer executes the read-out program codes, so that the functions of the foregoing embodiment are realized but also a case where the OS or the like which is operating on the computer executes a part or all of the actual processes on the basis of instructions of the program codes and the functions of the foregoing embodiment are realized by those processes.

Further, it will be obviously understood that the invention also incorporates a case where after the program codes read out from the memory medium were written into a memory provided for a function expanding board inserted into the computer or a function expanding unit connected to the computer, a CPU or the like equipped for the function expanding board or function expanding unit executes a part or all of the actual processes on the basis of instructions of the program codes, and the functions of the foregoing embodiment are realized by the processes.

According to the invention as described above, even in the case where on the basis of the print request from the external apparatus which can be newly connected to a network, the upper apparatus detects the printing apparatus and registers the print job into the detected printing apparatus, so that the external apparatus temporarily participates in the network and allows the printing apparatus connected to the network to print, there is an advantage such that the troublesome setting in the external apparatus is unnecessary.

According to the invention, by having the printing apparatus input means for inputting the designation of the printing apparatus, for example, there is an advantage such that the user can designate the printing apparatus.

According to the invention, in case of the print request in which the printing apparatus is not designated, there is an advantage such that even in the case where the upper apparatus detects the printing apparatus on the basis of the print request, so that the external apparatus temporarily participates in the network and allows the printing apparatus connected to the network to print, the troublesome setting in the external apparatus, for example, the designation of the printing apparatus is unnecessary.

According to the invention, in case of a print request in which the default printing apparatus is designated, there is an advantage such that even in the case where the upper apparatus detects the printing apparatus on the basis of the print request, so that the external apparatus temporarily participates in the network and allows the printing apparatus connected to the network to print, the troublesome setting in the external apparatus, for example, the designation of the printing apparatus is unnecessary.

According to the invention, in case of the print request in which the printer driver is designated, there is an advantage such that "the upper apparatus detects the printing apparatus corresponding to the printer driver on the basis of the print request, so that the external apparatus temporarily participates in the network and allows the printing apparatus connected to the network to print, the troublesome setting in the external apparatus, for example, the operation to select the printer driver in accordance with the printing apparatus is unnecessary.

According to the invention, there is an advantage such that even in the case where the external apparatus detects the upper apparatus on the network, so that the external apparatus temporarily participates in the network and allows the printing apparatus connected to the network to print, the troublesome setting in the external apparatus, for example, the designation of the upper apparatus is unnecessary.

What is claimed is:

1. A print system in which at least one printing apparatus and an upper apparatus for managing the at least one printing apparatus are provided on a network and an external apparatus can be newly connected to the network, wherein said external apparatus has print requesting means for issuing a print request to said upper apparatus, and said upper apparatus comprises:

printing apparatus selecting means for selecting a printing apparatus from among the at least one printing apparatus on the basis of the print request; and registering means for registering a print job corresponding to the print request into the selected printing apparatus, wherein said external apparatus sends print data corresponding to the print request to the selected printing apparatus.

2. A system according to claim 1, wherein said external apparatus has printing apparatus input means for inputting a designation of a printing apparatus.

3. A system according to claim 1, wherein, when said print requesting means of said external apparatus issues the print request without designating the printing apparatus, said printing apparatus selecting means of said upper apparatus selects the printing apparatus on the basis of the print request.

4. A system according to claim 1, wherein, when said print requesting means of said external apparatus designates a default printing apparatus and issues the print request, said printing apparatus selecting means of said upper apparatus selects the default printing apparatus on the basis of the print request.

5. A system according to claim 1, wherein, when said print requesting means of said external apparatus designates a printer driver and issues the print request, said printing apparatus selecting means of said upper apparatus selects the printing apparatus corresponding to the printer driver on the basis of the print request.

6. A system according to claim 1, wherein said external apparatus has upper apparatus detecting means for detecting the upper apparatus on the network.

7. A system according to claim 6, wherein said external apparatus has upper apparatus input means for inputting a designation of said upper apparatus, and said upper apparatus detecting means of said external apparatus detects the upper apparatus on the network unless said upper apparatus is designated by said upper apparatus input means.

8. A system according to claim 1, wherein said external apparatus is a portable personal computer.

9. A print job registering method to be performed by a print system in which a printing apparatus and an upper apparatus for managing at least one printing apparatus are provided on a network and an external apparatus can be newly connected to the network, wherein said external apparatus performs a print requesting step of issuing a print request to said upper apparatus, and said upper apparatus performs the steps of:

a printing apparatus selecting step of selecting a printing apparatus from among the at least one printing apparatus on the basis of the print request; and a registering step of registering a print job corresponding to the print request into the selected printing apparatus, wherein said external apparatus sends print data corresponding to the print request to the selected printing apparatus.

10. A method according to claim 9, wherein said external apparatus has a printing apparatus input step of inputting a designation of a printing apparatus.

11. A method according to claim 9, wherein, when the print request is issued without designating a printing apparatus name in said print requesting step of said external apparatus, the printing apparatus is selected on the basis of the print request in said printing apparatus selecting step of said upper apparatus.

12. A method according to claim 9, wherein, when a default printing apparatus is designated and the print request is issued in said print requesting step of said external apparatus, the default printing apparatus is selected on the basis of the print request in said printing apparatus selecting step of said upper apparatus.

13. A method according to claim 9, wherein, when a printer driver is designated and the print request is issued in said print requesting step of said external apparatus, the printing apparatus corresponding to the printer driver is selected on the basis of the print request in said printing apparatus selecting step of said upper apparatus.

14. A method according to claim 9, wherein said external apparatus has an upper apparatus detecting step of detecting the upper apparatus on the network.

15. A method according to claim 14, wherein said external apparatus has an upper apparatus input step of inputting a designation of said upper apparatus, and in said upper apparatus detecting step of said external apparatus, unless said upper apparatus is designated in said upper apparatus input step, the upper apparatus on the network is detected.

16. An information processing apparatus which is connected to at least one printing apparatus and an external apparatus through a network and which manages the at least one printing apparatus, comprising:

receiving means for receiving a print request from said external apparatus; and printing apparatus selecting means for, when the print request does not designate a printing apparatus, selecting a printing apparatus from among the at least one printing apparatus on the basis of the print request.

17. An information processing apparatus which is connected to at least one printing apparatus and an external apparatus through a network and which manages the at least one printing apparatus, comprising:

receiving means for receiving a print request from said external apparatus; and printing apparatus selecting means for, when the print request designates a default printing apparatus, selecting a default printing apparatus from among the at least one printing apparatus.

18. An information processing apparatus which is connected to at least one printing apparatus and an external apparatus through a network and which manages the at least one printing apparatus, comprising:

receiving means for receiving a print request form said external apparatus; and printing apparatus selecting means for, when the print request designates a printer driver, selecting a printing apparatus corresponding to the printer driver from among the at least one printing apparatus.

19. An information processing method to be performed by an upper apparatus which is connected to at least one printing apparatus and an external apparatus through a network and which manages the at least one printing apparatus, the method comprising the steps of:

a receiving step of receiving a print request from said external apparatus; and a printing apparatus selecting step of, when the print request does not designate a printing apparatus, selecting a printing apparatus from among the at least one printing apparatus on the basis of the print request.

20. An information processing method to be performed by an upper apparatus which is connected to at least one printing apparatus and an external apparatus through a network and which manages the at least one printing apparatus, the method comprising the steps of:

a receiving step of receiving a print request from said external apparatus; and a printing apparatus selecting step of, when the print request designates a default printing apparatus, selecting a default printing apparatus from among the at least one printing apparatus.

21. An information processing method to be performed by an upper apparatus which is connected to at least one printing apparatus and an external apparatus through a network and which manages the at least one printing apparatus, the method comprising the steps of:

a receiving step of receiving a print request form said external apparatus; and a printing apparatus selecting step of, when the print request designates a printer driver, selecting a printing apparatus corresponding to the printer driver from among the at least one printing apparatus.

22. A computer-readable medium which stores an information processing program to be performed by an upper apparatus which is connected to at least one printing apparatus and an external apparatus through a network and which manages the at least one printing apparatus, the program comprising the steps of:

a receiving step of receiving a print request from said external apparatus; and a printing apparatus selecting step of, when the print request does not designate a printing apparatus, selecting a printing apparatus from among the at least one printing apparatus on the basis of the print request.

23. A computer-readable medium which stores an information processing program to be performed by an upper apparatus which is connected to at least one printing apparatus and an external apparatus through a network and which manages the at least one printing apparatus, the program comprising the steps of:

a receiving step of receiving a print request from said external apparatus; and a printing apparatus selecting step of, when the print request designates a default printing apparatus, selecting a default printing apparatus from among the at least one printing apparatus.

24. A computer-readable medium which stores an information processing program to be performed by an upper apparatus which is connected to at least one printing apparatus and an external apparatus through a network and which manages the at least one printing apparatus, the program comprising the steps of:

a receiving step of receiving a print request from said external apparatus; and a printing apparatus selecting step of, when the print request designates a printer driver, selecting a printing apparatus corresponding to the printer driver from among the at least one printing apparatus.

25. An information processing apparatus which is connected to at least one printing apparatus and an external apparatus through a network and manages the at least one printing apparatus, comprising:

printing apparatus selecting means for selecting a printing apparatus from among the at least one printing apparatus on the basis of a print request issued from said external apparatus; and registering means for registering a print job corresponding to the print request for the selected printing apparatus, wherein the external apparatus sends print data corresponding to the print request to the selected printing apparatus.

26. An apparatus according to claim 25, wherein, in a case where the print request does not designate the printing apparatus, said printing apparatus selecting means of said information processing apparatus selects the printing apparatus on the basis of the print request.

27. An apparatus according to claim 25, wherein, in a case where the print request designates a default printing apparatus, said printing apparatus selecting means of said information processing apparatus selects the default printing apparatus on the basis of the print request.

28. An apparatus according to claim 25, wherein, in a case where the print request designates a printer driver, said printing apparatus selecting means of said information processing apparatus selects the printing apparatus corresponding to said printer driver on the basis of the print request.

29. An apparatus according to claim 25, wherein said external apparatus is a portable personal computer.

30. A print job registering method to be performed by an upper apparatus which is connected to at least one printing apparatus and an external apparatus through a network and which manages the at least one printing apparatus, the method comprising the steps of:

a printing apparatus selecting step of selecting a printing apparatus from among the at least one printing apparatus on the basis of a print request issued from said external apparatus; and a registering step of registering a print job corresponding to the print request for the selected printing apparatus, wherein the external apparatus sends print data corresponding to the print request to the selected printing apparatus.

31. A method according to claim 30, wherein, in a case where the print request does not designate a printing apparatus name, in said printing apparatus selecting step, the printing apparatus is selected on the basis of the print request.

32. A method according to claim 30, wherein, in a case where the print request designates a default printing apparatus, in said printing apparatus selecting step, the default printing apparatus is selected on the basis of the print request.

33. A method according to claim 30, wherein, in a case where the print request designates a printer driver, in said printing apparatus selecting step, the printing apparatus corresponding to the printer driver is selected on the basis of the print request.

34. A computer-readable recording medium which stores a program for executing a print job registering method to be performed by an upper apparatus which is connected to at least one printing apparatus and an external apparatus through a network and which manages the at least one printing apparatus, said print job registering method comprising the steps of:

a printing apparatus selecting step of selecting a printing apparatus from among the at least one printing apparatus on the basis of a print request issued from said external apparatus; and a registering step of registering a print job corresponding to the print request for said selected printing apparatus, wherein the external apparatus sends print data corresponding to the print request to the selected printing apparatus.

35. A medium according to claim 34, wherein, in a case where the print request does not designate a printing apparatus name, in said printing apparatus selecting step, the printing apparatus is selected on the basis of the print request.

36. A medium according to claim 34, wherein, in a case where the print request designates a default printing apparatus, in said printing apparatus selecting step, the default printing apparatus is selected on the basis of the print request.

37. A medium according to claim 34, wherein, in a case where the print request designates a printer driver, in said printing apparatus selecting step, the printing apparatus corresponding to the printer driver is selected on the basis of the print request.

38. An information processing apparatus which can be connected to an upper apparatus for managing at least one printing apparatus through a network, comprising:

print requesting means for issuing a print request to said upper apparatus; and printing apparatus input means for inputting a designation of a printing apparatus, wherein, the information processing apparatus sends print data corresponding to the print request to a printing apparatus which the upper apparatus selects from among the at least one printing apparatus on the basis of the issued print request.

39. An apparatus according to claim 38, wherein unless the printing apparatus is designated by said printing apparatus input means, said print requesting means issues the print request without designating the printing apparatus.

40. An apparatus according to claim 38, wherein when a default printing apparatus is designated by said printing apparatus input means, said print requesting means designates the default printing apparatus and issues the print request.

41. A print job registering method to be performed by an information processing apparatus which can be connected to an upper apparatus for managing at least one printing apparatus through a network, comprising the steps of:

a print requesting step of issuing a print request to said upper apparatus; and a printing apparatus input step of inputting a designation of a printing apparatus, wherein the information processing apparatus sends print data corresponding to the print request to a printing apparatus which the upper apparatus selects from among the at least one printing apparatus on the basis of the print request.

42. A method according to claim 41, wherein unless the printing apparatus is designated in said printing apparatus input step, in said print requesting step, the print request is issued without designating the printing apparatus.

43. A method according to claim 41, wherein when a default printing apparatus is designated in said printing apparatus input step, in said print requesting step, the default printing apparatus is designated and the print request is issued.

44. A computer-readable recording medium which stores a program for executing a print job registering method to be performed by an information processing apparatus which can be connected to an upper apparatus for managing at least one printing apparatus through a network, wherein said print job registering method comprises the steps of:

a print requesting step of issuing a print request to said upper apparatus; and a printing apparatus input step of inputting a designation of a printing apparatus, wherein the information processing apparatus sends print data corresponding to the print request to a printing apparatus which the upper apparatus selects from among the at least one printing apparatus on the basis of the print request.

45. A medium according to claim 44, wherein unless the printing apparatus is designated in said printing apparatus input step, in said print requesting step, the print request is issued without designating the printing apparatus.

46. A medium according to claim 44, wherein when a default printing apparatus is designated in said printing apparatus input step, in said print requesting step, the default printing apparatus is designated and the print request is issued.

* * * * *

UNITED STATES PATENT AND TRADEMARK OFFICE
CERTIFICATE OF CORRECTION

PATENT NO. : 6,829,059 B1
DATED : December 7, 2004
INVENTOR(S) : Mitsuo Kimura

It is certified that error appears in the above-identified patent and that said Letters Patent is hereby corrected as shown below:

Column 5,
Line 26, "and HD" should read -- the HD --.

Column 13,
Line 1, " "the" should read -- the --.

Column 15,
Lines 3 and 37, "form" should read -- from --.

Column 17,
Line 45, "wherein," should read -- wherein --.

Signed and Sealed this

Seventh Day of February, 2006

JON W. DUDAS
*Director of the United States Patent and Trademark Office*